(12) United States Patent
Shields

(10) Patent No.: US 9,491,205 B2
(45) Date of Patent: Nov. 8, 2016

(54) COMMUNICATION SYSTEMS AND RELATED METHODS FOR COMMUNICATING WITH DEVICES HAVING A PLURALITY OF UNIQUE IDENTIFIERS

(71) Applicant: Sorenson Communications, Inc., Salt Lake City, UT (US)

(72) Inventor: Richard Shields, Salt Lake City, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 352 days.

(21) Appl. No.: 13/842,401

(22) Filed: Mar. 15, 2013

(65) Prior Publication Data

US 2014/0280562 A1 Sep. 18, 2014

(51) Int. Cl.
*G06F 15/16* (2006.01)
*H04L 29/06* (2006.01)
*H04W 4/10* (2009.01)
(Continued)

(52) U.S. Cl.
CPC ......... *H04L 65/403* (2013.01); *H04L 65/1069* (2013.01); *H04L 61/2069* (2013.01); *H04M 3/56* (2013.01); *H04W 4/10* (2013.01)

(58) Field of Classification Search
CPC ... H04M 3/56–3/568; H04L 65/403–65/4053; H04L 65/1066–65/1069; H04L 61/15–61/1594; H04L 61/30–61/3095; H04L 61/2069; H04W 4/06–4/10
See application file for complete search history.

(56) References Cited

U.S. PATENT DOCUMENTS 5,408,528 A * 4/1995 Carlson ................ H04M 3/436
370/360

5,619,555 A 4/1997 Fenton et al.
(Continued)

FOREIGN PATENT DOCUMENTS

EP 2 104 324 A2 9/2009
EP 2 369 883 A1 9/2011
(Continued)

OTHER PUBLICATIONS

1Number User Guide The Z, at http://www.zvrs.com/services/features/1number, at least as early as Feb. 8, 2012.
(Continued)

*Primary Examiner* — Emmanuel L Moise
*Assistant Examiner* — Julian Chang
(74) *Attorney, Agent, or Firm* — TraskBritt

(57) ABSTRACT

A communication system comprises a server configured to associate a plurality of communication devices with each other in a user group. Each communication device of the plurality of communication devices is associated with a group-wide individual unique identifier that is unique as to other members of the same group; a network-wide individual unique identifier that is unique as to other communication devices of the network; and a group unique identifier that is shared with the plurality of communication devices of the user group. A method comprises receiving a call request including a group-wide individual unique identifier, and sending an outgoing call to the individual communication device. The group-wide individual unique identifier is unique to an individual communication device within a user group of communication devices that is smaller than a number of communication devices configured for communication on a network.

22 Claims, 13 Drawing Sheets

(51) Int. Cl.
*H04M 3/56* (2006.01)
*H04L 29/12* (2006.01)

(56) References Cited

U.S. PATENT DOCUMENTS

| | | | |
|---|---|---|---|
| 5,815,563 A * | 9/1998 | Ardon | 379/211.01 |
| 5,923,733 A * | 7/1999 | Binns et al. | 379/88.23 |
| 5,930,723 A * | 7/1999 | Heiskari et al. | 455/518 |
| 6,018,668 A * | 1/2000 | Schmidt | 455/518 |
| 6,442,268 B1 * | 8/2002 | Klaghofer | H04M 3/46 370/259 |
| 6,574,655 B1 * | 6/2003 | Libert et al. | 709/200 |
| 6,678,515 B1 * | 1/2004 | Gillespie | H04M 3/42068 455/412.1 |
| 6,738,390 B1 * | 5/2004 | Xu | H04L 29/06 370/467 |
| 6,993,355 B1 | 1/2006 | Pershan | |
| 7,050,861 B1 * | 5/2006 | Lauzon et al. | 700/17 |
| 7,283,833 B2 | 10/2007 | Fukui et al. | |
| 7,302,496 B1 * | 11/2007 | Metzger | H04L 61/2546 370/236 |
| 7,526,306 B2 | 4/2009 | Brems et al. | |
| 7,801,953 B1 * | 9/2010 | Denman et al. | 709/204 |
| 7,853,703 B1 * | 12/2010 | McBarron et al. | 709/228 |
| 7,990,960 B2 * | 8/2011 | Bakker | H04L 63/0421 370/352 |
| 8,223,930 B2 | 7/2012 | Narang et al. | |
| 8,289,900 B2 | 10/2012 | DuMas et al. | |
| 8,358,765 B1 * | 1/2013 | Whitten et al. | 379/211.04 |
| 8,462,772 B1 * | 6/2013 | Robbins | H04L 65/1076 370/260 |
| 8,520,807 B1 * | 8/2013 | Hewinson | 379/88.01 |
| 8,549,603 B2 * | 10/2013 | Buckley | H04L 29/12047 713/156 |
| 8,644,817 B1 * | 2/2014 | Ezell | H04L 65/1073 370/331 |
| 8,917,820 B2 * | 12/2014 | Michaelis | 379/52 |
| 9,025,755 B1 * | 5/2015 | Jayapalan | G06Q 10/10 379/114.02 |
| 9,060,057 B1 * | 6/2015 | Danis | H04M 3/42059 |
| 2002/0057783 A1 * | 5/2002 | Kredo et al. | 379/218.01 |
| 2003/0009592 A1 * | 1/2003 | Stahura | 709/245 |
| 2003/0041138 A1 * | 2/2003 | Kampe et al. | 709/223 |
| 2003/0086554 A1 * | 5/2003 | Krimstock et al. | 379/265.02 |
| 2003/0093537 A1 * | 5/2003 | Tremlett et al. | 709/228 |
| 2003/0097466 A1 * | 5/2003 | Sung | 709/238 |
| 2003/0125072 A1 * | 7/2003 | Dent | H04W 76/002 455/551 |
| 2003/0185232 A1 * | 10/2003 | Moore | G06Q 20/085 370/465 |
| 2003/0200298 A1 * | 10/2003 | Su | H04L 29/06027 709/223 |
| 2004/0081136 A1 | 4/2004 | Brown et al. | |
| 2004/0137882 A1 * | 7/2004 | Forsyth | 455/414.1 |
| 2004/0223598 A1 * | 11/2004 | Spiridellis | 379/201.01 |
| 2004/0248594 A1 * | 12/2004 | Wren, III | H04W 84/16 455/465 |
| 2005/0044256 A1 * | 2/2005 | Saidi | H04L 65/80 709/232 |
| 2005/0097222 A1 * | 5/2005 | Jiang | H04L 29/06027 709/245 |
| 2005/0125543 A1 * | 6/2005 | Park | H04L 65/1006 709/227 |
| 2005/0210395 A1 * | 9/2005 | Wakita | G06F 21/6245 715/753 |
| 2005/0267876 A1 | 12/2005 | Watanabe et al. | |
| 2006/0018272 A1 * | 1/2006 | Mutikainen | H04L 29/12009 370/328 |
| 2006/0099983 A1 | 5/2006 | Kim | |
| 2006/0182130 A1 * | 8/2006 | Even | H04L 12/1822 370/401 |
| 2006/0230043 A1 * | 10/2006 | Sumner-Moore | 707/9 |
| 2007/0037562 A1 * | 2/2007 | Smith-Kerker | H04M 3/465 455/418 |
| 2007/0064894 A1 * | 3/2007 | Armstrong | H04M 3/42391 379/142.07 |
| 2007/0097994 A1 * | 5/2007 | Samdadiya | H04L 29/06027 370/401 |
| 2007/0121584 A1 * | 5/2007 | Qiu | H04M 3/42042 370/352 |
| 2007/0153777 A1 * | 7/2007 | Coulas | H04L 29/12188 370/356 |
| 2007/0155370 A1 * | 7/2007 | Daigle | H04M 3/42263 455/415 |
| 2007/0167141 A1 * | 7/2007 | Akiyama | 455/90.1 |
| 2007/0232342 A1 * | 10/2007 | Larocca | H04M 1/67 455/518 |
| 2007/0280464 A1 * | 12/2007 | Hughes et al. | 379/205.01 |
| 2008/0002671 A1 * | 1/2008 | Nagai | 370/352 |
| 2008/0025316 A1 * | 1/2008 | Zampiello | H04L 29/12066 370/395.3 |
| 2008/0037745 A1 * | 2/2008 | Ramamoorthy et al. | 379/201.01 |
| 2008/0037748 A1 | 2/2008 | Jefferson et al. | |
| 2008/0064350 A1 * | 3/2008 | Winkler | H04M 3/42008 455/187.1 |
| 2008/0119172 A1 * | 5/2008 | Rao et al. | 455/414.1 |
| 2008/0175223 A1 * | 7/2008 | Croak | H04M 3/42042 370/352 |
| 2008/0189351 A1 * | 8/2008 | Nemoto et al. | 709/201 |
| 2008/0198987 A1 * | 8/2008 | Daly | H04M 3/229 379/114.05 |
| 2008/0288494 A1 | 11/2008 | Brogger et al. | |
| 2009/0013380 A1 * | 1/2009 | Chandrasiri et al. | 726/3 |
| 2009/0028300 A1 * | 1/2009 | McLaughlin | H04M 3/42391 379/52 |
| 2009/0034696 A1 * | 2/2009 | Ramanathan | 379/88.17 |
| 2009/0086947 A1 * | 4/2009 | Vendrow | H04M 3/02 379/201.12 |
| 2009/0098853 A1 * | 4/2009 | Mutikainen | H04L 29/12188 455/406 |
| 2009/0103691 A1 * | 4/2009 | Hume | H04M 7/0069 379/88.17 |
| 2009/0106199 A1 * | 4/2009 | Wang | 707/3 |
| 2009/0150562 A1 * | 6/2009 | Kim | H04N 7/173 709/238 |
| 2009/0238356 A1 | 9/2009 | Kojo et al. | |
| 2009/0238358 A1 * | 9/2009 | Ramanathan | H04M 3/42042 379/221.03 |
| 2009/0252158 A1 * | 10/2009 | Maag | H04L 65/1069 370/352 |
| 2010/0086111 A1 * | 4/2010 | Gruchala | H04M 3/42059 379/93.17 |
| 2010/0136980 A1 * | 6/2010 | Linquist et al. | 455/445 |
| 2010/0150327 A1 * | 6/2010 | Belz | H04M 1/575 379/142.04 |
| 2010/0157851 A1 * | 6/2010 | Farah | H04M 3/42008 370/260 |
| 2010/0165976 A1 * | 7/2010 | Khan | H04M 3/42263 370/352 |
| 2010/0167763 A1 * | 7/2010 | Bouthemy | H04L 45/16 455/466 |
| 2010/0184454 A1 * | 7/2010 | Luft et al. | 455/456.5 |
| 2010/0189247 A1 * | 7/2010 | Sakano | H04M 3/02 379/207.16 |
| 2010/0220714 A1 * | 9/2010 | Clark | H04M 3/46 370/352 |
| 2010/0322391 A1 * | 12/2010 | Michaelis | H04M 3/42391 379/45 |
| 2010/0329121 A1 * | 12/2010 | Boyle | H04L 29/12122 370/241 |
| 2011/0026700 A1 * | 2/2011 | Clark | H04M 1/2535 379/142.15 |
| 2011/0106971 A1 * | 5/2011 | Siegel | H04L 65/1016 709/238 |
| 2011/0135077 A1 * | 6/2011 | Wengrovitz | 379/202.01 |
| 2011/0142221 A1 | 6/2011 | Tofighbakhsh et al. | |
| 2011/0159889 A1 * | 6/2011 | Kojo | H04M 3/229 455/456.1 |
| 2011/0164610 A1 * | 7/2011 | Cabasse | H04M 3/5191 370/352 |
| 2011/0179184 A1 * | 7/2011 | Breau | H04L 61/106 709/231 |

(56) References Cited

U.S. PATENT DOCUMENTS

| Publication | Date | Inventor | Classification/Page |
|---|---|---|---|
| 2011/0197058 A1* | 8/2011 | Mayer | H04L 29/12594 713/150 |
| 2011/0199915 A1 | 8/2011 | Santhanam et al. | |
| 2011/0206196 A1* | 8/2011 | Isaacson | G06Q 10/10 379/142.06 |
| 2011/0270880 A1* | 11/2011 | Jesse et al. | 707/770 |
| 2011/0317684 A1* | 12/2011 | Lazzaro et al. | 370/352 |
| 2012/0002816 A1* | 1/2012 | Tian | H04L 9/0822 380/270 |
| 2012/0022872 A1* | 1/2012 | Gruber | G06F 17/279 704/270.1 |
| 2012/0028618 A1 | 2/2012 | Goel et al. | |
| 2012/0051529 A1* | 3/2012 | Dobbins | H04L 61/106 379/142.06 |
| 2012/0088476 A1* | 4/2012 | Greenfield | H04M 1/72572 455/414.1 |
| 2012/0102073 A1* | 4/2012 | Patel | 707/803 |
| 2012/0200419 A1* | 8/2012 | Nylund | H04L 67/18 340/686.1 |
| 2012/0220325 A1* | 8/2012 | Zhou et al. | 455/509 |
| 2012/0233327 A1* | 9/2012 | Smith | H04L 65/1006 709/225 |
| 2012/0257756 A1 | 10/2012 | Huang et al. | |
| 2012/0296756 A1 | 11/2012 | Shah | |
| 2012/0314849 A1 | 12/2012 | LeBlanc et al. | |
| 2013/0010708 A1 | 1/2013 | Abraham et al. | |
| 2013/0021957 A1* | 1/2013 | Fang et al. | 370/311 |
| 2013/0070912 A1* | 3/2013 | Parandekar et al. | 379/88.05 |
| 2013/0100870 A1* | 4/2013 | Xie et al. | 370/310 |
| 2013/0173812 A1* | 7/2013 | Ezell | H04L 65/1016 709/228 |
| 2013/0208676 A1* | 8/2013 | Klein | H04L 65/1016 370/329 |
| 2013/0215774 A1* | 8/2013 | Bender | H04L 65/1083 370/252 |
| 2013/0216034 A1* | 8/2013 | Mahalingam | H04M 3/563 379/205.01 |
| 2013/0219070 A1* | 8/2013 | Kramarenko | H04L 65/1069 709/227 |
| 2013/0223318 A1* | 8/2013 | Liu et al. | 370/312 |
| 2013/0229948 A1* | 9/2013 | Stewart | H04M 3/42246 370/259 |
| 2013/0272513 A1* | 10/2013 | Phadnis | H04M 11/00 379/93.23 |
| 2014/0025949 A1* | 1/2014 | Kay | H04L 63/0428 713/168 |
| 2014/0029474 A1* | 1/2014 | Bhagavatula | H04L 65/1093 370/260 |
| 2014/0029475 A1* | 1/2014 | Bhagavatula | H04L 41/0806 370/260 |
| 2014/0029478 A1* | 1/2014 | Bhagavatula | H04L 65/1053 370/271 |
| 2014/0148136 A1* | 5/2014 | Thange | 455/414.1 |
| 2014/0168344 A1* | 6/2014 | Shoemake | H04N 7/147 348/14.01 |
| 2014/0248852 A1* | 9/2014 | Raleigh | H04M 15/723 455/407 |
| 2014/0267580 A1* | 9/2014 | Parent et al. | 348/14.12 |
| 2014/0272814 A1 | 9/2014 | Parent et al. | |
| 2014/0280562 A1* | 9/2014 | Shields | 709/204 |
| 2014/0282041 A1* | 9/2014 | Walker et al. | 715/739 |
| 2014/0282095 A1 | 9/2014 | Walters et al. | |
| 2014/0282888 A1* | 9/2014 | Brooksby | H04M 3/42391 726/4 |

FOREIGN PATENT DOCUMENTS

| | | |
|---|---|---|
| WO | WO 00/30374 | 5/2000 |
| WO | WO 2005/101757 A1 | 10/2005 |
| WO | WO 2008/124447 A1 | 10/2008 |

OTHER PUBLICATIONS

1Number Quick Start Guide, at http://www.zvrs.com/services/features/1number, at least as early as Feb. 8, 2012.

Z-20 User Guide, at http://www.zvrs.com/products/hardware/z-20/, at least as early as Feb. 7, 2012.

* cited by examiner

COMMUNICATION SYSTEMS AND RELATED METHODS FOR COMMUNICATING WITH DEVICES HAVING A PLURALITY OF UNIQUE IDENTIFIERS

CROSS-REFERENCE TO RELATED APPLICATIONS

This application is related to U.S. patent application Ser. No. 13/840,046, entitled "SYSTEMS INCLUDING AND METHODS OF OPERATING COMMUNICATION DEVICES ASSIGNED INDIVIDUAL AND GROUP IDENTITIES," filed on Mar. 15, 2013, U.S. patent application Ser. No. 13/839,384, entitled "SYSTEMS, METHODS, AND DEVICES FOR REPLACING A CONTACT ENTRY CORRESPONDING TO A COMMUNICATION DEVICE WITH A CONTACT ENTRY CORRESPONDING TO A USER GROUP," filed on Mar. 15, 2013, U.S. patent application Ser. No. 13/857,619, entitled "COMMUNICATION SYSTEMS AND RELATED METHODS FOR NOTIFYING DEVICES HAVING A PLURALITY OF UNIQUE IDENTIFIERS ABOUT MISSED COMMUNICATIONS," filed on Mar. 15, 2013, and U.S. patent application Ser. No. 13/840,659, entitled "A USER INTERFACE FOR CREATING AND ADMINISTERING A USER GROUP, AND METHODS OF OPERATING SUCH," filed on Mar. 15, 2013, the disclosure of each of which is incorporated herein by this reference in its entirety.

FIELD

Embodiments of the present disclosure relate to operating a plurality of communication devices as a group within a communication system. More particularly, the present disclosure relates to operation of video communication devices for the hearing impaired.

BACKGROUND

Video phone communication systems provide visual and audio communication between two or more users during a communication session. A video phone at a first location can transmit and receive audio and video signals to and from a video phone at a second location such that participants at the first location are perceived to be present or face-to-face with participants at a second location and vice versa.

Video phone communication systems span a variety of applications. One contemplated application of a video phone system includes facilitization of a communication session of a hearing-impaired user (e.g., deaf or hard of hearing), because many individuals with significant hearing loss are not able to communicate effectively over conventional telephone systems that rely upon voice communications. The hearing-impaired user may use a video phone during a communication session to relay his or her expressions over the video phone communication system. Such video phone communication systems may facilitate communication sessions between different hearing-impaired users (e.g., video phone to video phone communication), or between a hearing-impaired user and a hearing-capable user (e.g., video phone to voice phone communication), which may be assisted through a video relay service (VRS) that may provide an interpretive (i.e., translation) service by providing a hearing-capable translator who relays the expressions of the hearing-impaired caller to a hearing-capable user on the other end of the communication session in a conventional manner, such as through the use of a voice-based dialogue conveyed over a conventional voice phone. The hearing-capable translator may also translate the voice-based dialogue back to the hearing-impaired user into expressions (e.g., American Sign Language (ASL)).

As a consequence of the recent proliferation of communication devices, many people own several communication devices capable of video calls. For example, a single user may have one or more video phones at home, one or more video phones at their place of employment, a smart phone device, a tablet computer, a laptop computer, and/or a personal computer. The user may use some or all of these communication devices for video calls.

Conventionally, each of these communication devices are individually managed and are associated with separate user accounts. As a result, a user of multiple communication devices may be required to keep track of different log in credentials for each separate communication device. In addition, each individual communication device may have its own unique identifier (e.g., phone number, IP address, or other similar identifier used by a specific system) that is used to make and receive video calls. As a result, users have the burden of informing others what the unique identifiers are for each individual communication device so that others may contact them. Other people may also be inconvenienced by keeping track of several unique identifiers for the user when dialing a call to or receiving caller identification (caller ID) information from the user's various communication devices.

Also, having a plurality of different communication devices may become burdensome for the user to maintain information among each of their communication devices. For example, if a user desires to block an undesired caller, change device or account settings, access messages, or add new contacts to a directory on one of the communication devices, the action may need to be repeated separately on each of the rest of the communication devices. Furthermore, if a video call is missed on one of the communication devices, the user often only becomes aware of the missed call only when the user is again in the proximity of that particular communication device.

BRIEF SUMMARY

Embodiments of the present disclosure include a communication system. The communication system comprises a server configured to associate a plurality of communication devices with each other in a user group. Each communication device of the plurality of communication devices is associated with a group-wide individual unique identifier that is unique as to other members of the same group; a network-wide individual unique identifier that is unique as to other communication devices of the network; and a group unique identifier that is shared with the plurality of communication devices of the user group.

In some embodiments, the present disclosure comprises a communication system. The communication system comprises a server configured to coordinate communication sessions between a plurality of communication devices. The server is configured to enable: each communication device of the plurality of communication devices to be associated with an individual unique identifier that is unique to an individual communication device; and at least some of the communication devices of the plurality of communication devices to be associated with a group unique identifier that is shared by communication devices that are part of a common user group.

In other embodiments, the present disclosure comprises a method for establishing communication between a plurality of communication devices. The method comprises receiving a call request including a group-wide individual unique identifier, and sending an outgoing call to the individual communication device. The group-wide individual unique identifier is unique to an individual communication device within a user group of communication devices that is smaller than a number of communication devices configured for communication on a network.

In other embodiments, the present disclosure comprises a method for establishing communication between a plurality of communication devices. The method comprises receiving a call request including a group unique identifier from a first communication device of a user group, the group unique identifier being shared by a plurality of communication devices of the user group, and sending an outgoing call to the plurality of communication device of the user group.

DETAILED DESCRIPTION

Figure 1:
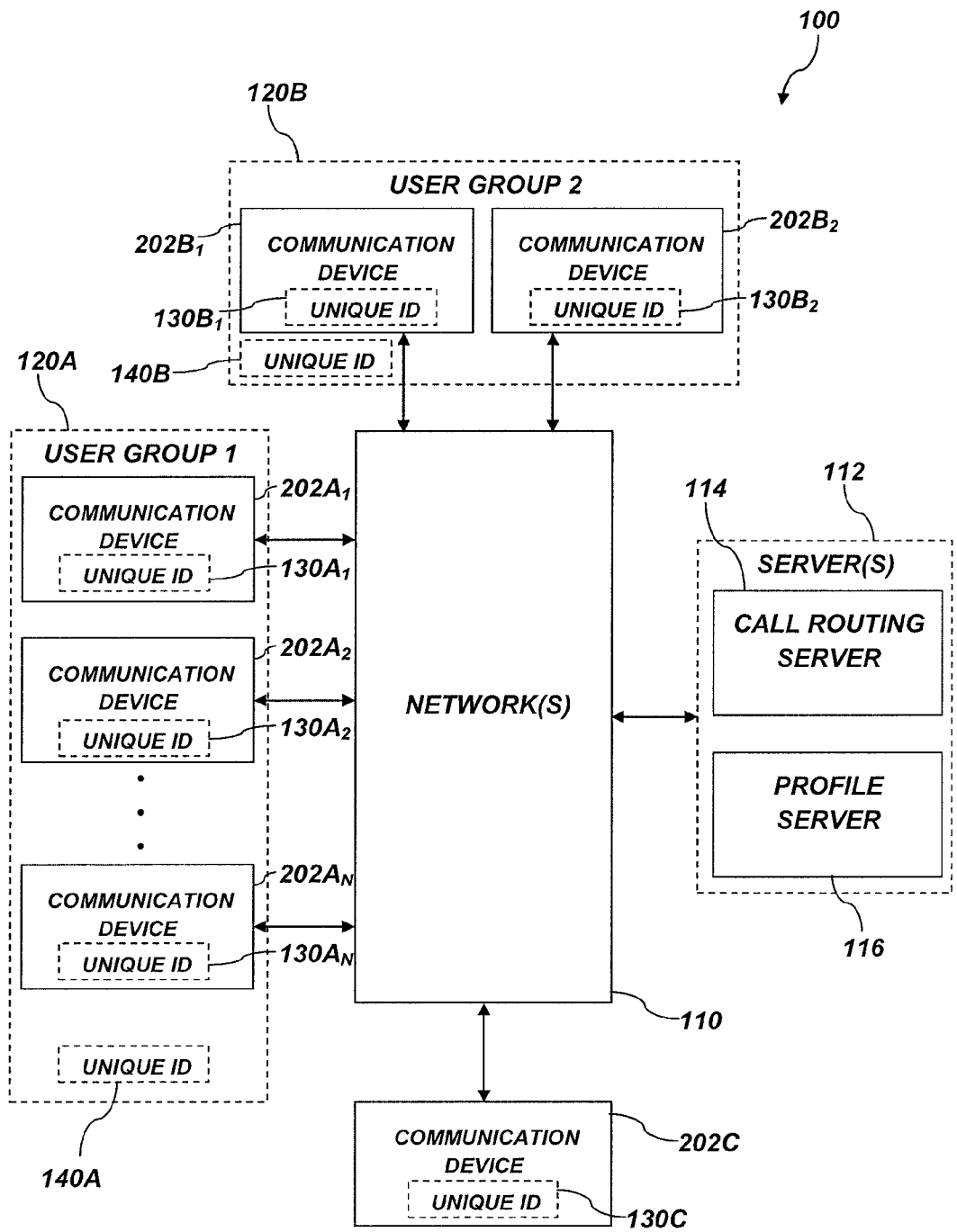
FIG. 1 is a simplified block diagram of a communication system according to an embodiment of the present disclosure.

In the following detailed description, reference is made to the accompanying drawings that form a part hereof, and in which is shown by way of illustration, specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions rearrangements, or combinations thereof within the scope of the present disclosure may be made and will become apparent to those of ordinary skill in the art.

In accordance with common practice the various features illustrated in the drawings may not be drawn to scale. The illustrations presented herein are not meant to be actual views of any particular method, device, or system, but are merely idealized representations that are employed to describe various embodiments of the present disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

As discussed above, video communication systems span a variety of applications. Embodiments of the present disclosure are generally described herein with reference to a video communication system for use by hearing-impaired users. Such video communication systems may facilitate communication sessions between different hearing-impaired users (e.g., video phone to video phone communication), or between a hearing-impaired user and a hearing-capable user (e.g., video phone to voice phone communication), which may be assisted through a video relay service (VRS). It should be noted, however, that embodiments of the present disclosure may include any application or environment where communication between devices may be helpful or desirable. For example, it is contemplated that embodiments of the present disclosure may include video communication session between hearing-capable users.

The term "call" refers to a communication with a communication device that may be routed through a number of networks, such as, for example, a private network, the internet, a telephone system, and a VRS. The term "incoming call" refers to an incoming communication to a communication device.

The term "communication device" may refer to a specific compilation of hardware components, software components, or a combination thereof. The term "communication device" may also refer to a software based communication device that exists on a device configured to execute machine-readable commands, such as, for example a computer. As software, it should be understood that the same communication device may exist on a first device while a user accesses the communication device on the first device, and on a second device at a different time while the user accesses the communication device on the second device.

FIG. 1 is a simplified block diagram of a communication system 100 according to an embodiment of the present disclosure. The communication system 100 may include a plurality of communication devices $202A_1$, $202A_2$, ... $202A_N$, $202B_1$, $B_2$, $202C$ (which are collectively referred to as communication devices 202). In some instances, reference may be made to an individual communication device by the generic designation of reference numeral 202. The communication system 100 may further include one or more servers 112, with which the communication devices 202 communicate through one or more networks 110. In other words, the communication devices 202 may be configured to establish communication with the one or more servers 112 (also referred to simply as "servers" 112) through the one or more networks 110 (also referred to simply as "networks" 110). The communication devices 202 may be configured to communicate with each other over a video call with the assistance of the servers 112 as described more fully below.

Each of the communication devices 202 may be assigned an individual unique identifier 130. In some instances, reference may be made to an individual unique identifier by the general designation of reference numeral 130. For example, communication devices $202A_1$, $202A_2$, ... $202A_N$ may respectively be assigned an individual unique identifier $130A_1$, $130A_2$, ... $130A_N$. In addition, the communication devices $202B_1$, $202B_2$ may respectively be assigned an individual unique identifier $130B_1$, $130B_2$. The communication device 202C may be assigned an individual unique identifier 130C. The individual unique identifier 130 is, therefore, device-centric rather than user-centric or location-centric. In other words, an individual unique identifier 130 may be associated with an individual communication device 202. In general, individual unique identifiers 130 are not shared by multiple communication devices 202. In some respects, an individual unique identifier 130 may be similar to a telephone number. For example, the individual unique identifier 130 may be used by other people to initiate video calls with the user of the communication device 202 associated with the individual unique identifier 130. In other respects, the individual unique identifier 130 may be similar to an IP address. For example, the individual unique identifier 130 may be used to identify the communication devices 202 to the servers 112. The individual unique identifier 130 may have a numerical format, such as an IP address or a phone number (e.g., a seven digit number, a ten digit number including an area code, etc.). The individual unique identifier 130 may have an alphabetic format (e.g., a word, a phrase, etc.), an alphanumerical format, or other suitable format used to uniquely identify an individual communication device 202. As another non-limiting example, the individual unique identifier 130 may be a Media Access Control (MAC) address, which uniquely identifies a network interface of the communication device 202.

The communication devices 202 may also be associated with one or more user groups 120A, 120B (which are collectively referred to as user groups 120). In some instances, reference may be made to an individual user group by the generic designation of reference numeral 120. A user group 120 may be may be an association (i.e., grouping) of communication devices 202 that are defined as members of the user group 120, as desired by a user. A user group 120 may be associated with any number of communication devices 202 so long as there are at least two communication devices 202 grouped together by the user. By way of non-limiting example, communication devices $202A_1$, $202A_2$, ... $202A_N$ may be associated with a first user group 120A. The first user group 120A may be associated with a first user. Other communication devices $202B_1$, $202B_2$ may be associated with a second user group 120B. The second user group 120B may be associated with a second user. The communication system 100 may include communication devices 202, such as communication device 202C, which may not be associated with any user group.

The user groups 120A, 120B may respectively be assigned group unique identifiers 140A, 140B (which are collectively referred to as group unique identifiers 140). The group unique identifiers 140 are unique to a group rather than to an individual communication device 202. In other words, the group unique identifiers 140 are group-centric, such that the group unique identifiers 140 are not shared by other user groups 120. Therefore, individual communication devices 202 may be associated with both an individual unique identifier 130 and a group unique identifier 140. For example, a first communication device $202A_1$ may be associated with the individual unique identifier $130A_1$ and the group unique identifier 140A. Likewise, a second communication device 202A2 may be associated with the individual unique identifier $130A_2$ and the group unique identifier 140A. Thus, because the first communication device $202A_1$ and the second communication device $202A_2$ are part of the same user group 120A, the first communication device $202A_1$ and the second communication device $202A_2$ share the same group unique identifier 140A (but not individual unique identifiers $130A_1$, $130A_2$). Other user groups (e.g., user group 120B) may be similarly configured.

A call may be initiated to the communication devices 202 by being addressed by either its individual unique identifier 130 or its group unique identifier 140. For example, if a person (e.g., the second user) calls the first user by entering the individual unique identifier $130A_1$, only the individual communication device 202A1 may indicate an incoming call. If, however, a person calls the first user by entering the group unique identifier 140A assigned to the first user group 120A, each of the communication devices $202A_1$, $202A_2$, ... $202A_N$ of the first user group 120A may indicate an incoming call. An incoming call may be indicated visually, tactilely, audibly, or some other suitable indication, and combinations thereof. For hearing-impaired users, an incoming call may be indicated visually, tactilely, and combinations thereof.

As discussed above, the communication devices 202 may be associated with a user group 120 as desired by the user. In other words, the reasons for grouping the communication devices 202 within a particular user group 120 may be determined by the user acting as a group organizer, rather than any particular limitation. For example, each communication device 202 belonging to a user group 120 need not be located in close proximity to each other. By way of non-limiting example, a single user group 120 may include a communication device 202 stationed at a user's dwelling, a communication device 202 at the user's place of employment, a communication device 202 at the user's cabin, and a portable communication device 202 that may be carried anywhere. It should also be understood that two or more communication devices 202 from the same user group 120 may be located proximate to each other. By way of non-limiting example, two or more communication devices 202 from the same user group 120 may be stationed in various locations of the user's home, such as in the living room, the kitchen, the bedroom, etc.

In addition, the communication devices 202 associated with a single user group 120 may belong to two or more users. By way of non-limiting example, communication devices 202 belonging to friends, family members, co-workers, and/or roommates may be part of a single user group 120. As a result, the user acting as the group organizer may invite others to join one or more of their communication devices 202 to join his group. For example, a user group 120 may be a group of co-workers within a team or practice group, such as a technical support team.

A single user group 120 may also include several different types of communication devices 202. By way of non-limiting example, an individual user group 120 may include any one or more of a personal computer, a smart phone, a tablet computer, and a video phone. In addition, a single user group 120 may include multiple communication devices from the same device type. For example, an individual user group 120 may have a plurality of video phones within the same individual user group 120. Furthermore, a single user group 120 may include any number of communication devices 202, limited only by the capacity of the communication system 100, and/or a desire to limit services to user groups 120 of a predetermined number of communication devices 202. By way of non-limiting example, administrators of a communication system 100 may choose to limit the number of communication devices 202 that a group organizer may be allowed to include within single user group 120 to a maximum number (e.g., five, six, etc.) of allowed communication devices 202.

The communication devices 202 may be configured to enable a user to participate in video calls with the other communication devices 202 of the communication system 100. A "video call" refers to communications where real-time or quasi real-time video data is exchanged between at least two parties. A video call may also refer to an attempted initiation of a real-time or quasi real-time video data exchange. For example, a first user using a first communication device $202A_1$ may communicate with one or more other users using any of the other communication devices $202A_2$, ... $202A_N$ associated with the first user group 120A, the communication devices $202B_1$, $202B_2$, associated with the second user group 120B, another communication device 202C not associated with a user group 120, and combinations thereof.

Any one of a variety of communication devices 202 may be configured to place and receive video calls, in part, because advancements in communication device technology have substantially increased the quantity, variety, and affordability of communication devices. By way of non-limiting example, the communication devices 202 may include any of a video phone, a desktop computer, a laptop computer, a tablet computer, a smart phone, and other suitable devices. Examples of a video phone include the NTOUCH® VP video phone and the VP-200 video phone available from SORENSON COMMUNICATIONS® of Salt Lake City, Utah. More device-level detail on the communication devices 202 is discussed below with reference to FIG. 2.

The networks 110 may include an internet protocol network configured to transmit communications between each of the plurality of communication devices 202 and the servers 112, such as by using an internet protocol (IP). The networks 110 may include a wide area network (WAN), a local area network (LAN), a personal area network (PAN), and combinations thereof. In some embodiments, the servers 112 may be part of a cloud network. The networks 110 may be configured to communicate with the plurality of communication devices 202 and the servers 112 wirelessly, through a cable, and combinations thereof. Some non-limiting examples of suitable wireless communications may include "wifi," Bluetooth, and mobile wireless networks. Some non-limiting examples of suitable cables include fiber-optic cables, coaxial cables, traditional telephone cables, and Ethernet cables.

The servers 112 may be configured to provide services to the communication devices 202. For example, the servers 112 may be configured to manage calling functions, such as video call sessions and messages for the communication devices 202 of the communication system 100. In addition, the servers 112 may store and manage account information for the communication devices 202. Account information may include address books, account billings, and other information corresponding to the communication device 202 associated with the individual unique identifier 130. As non-limiting examples, the servers 112 may include a call routing server 114 and a profile server 116. Although discussed herein separately, the call routing server 114 and the profile server 116 may optionally be implemented as a single server device. Likewise, both the call routing server 114 and the profile server 116 may optionally include multiple server devices, and the various functions of the call routing server 114 and the profile server 116 may not necessarily be isolated to separate devices.

The call routing server 114 may be configured to set up and control a video call between one or more of the plurality of communication devices 202 and another of the plurality of communication devices 202, or a communication device associated with another user (not shown). The call routing server 114 may be configured to establish and control the video call through, for example, a session initiation protocol (SIP), or other suitable protocol.

The call routing server 114 may also periodically receive communications from each of the plurality of communication devices 202, including location or contact information, so that the call routing server 114 may locate and setup video call sessions with the communication devices 202 as needed. Also, the call routing server 114 may cause a particular communication device 202 to indicate an incoming call responsive to another person entering the individual unique identifier 130 assigned to the particular communication device 202. Furthermore, when the user enters the individual unique identifier 130 associated with another communication device 202 from one of the plurality of communication devices 202, the call routing server 114 may arrange for an outgoing call to be sent to the communication device 202 with the entered individual unique identifier 130 assigned thereto. In addition, when the user enters the group unique identifier 140 associated with a user group 120, the call routing server 114 may arrange for an outgoing call to be sent to each of the communication devices 202 associated with the entered group unique identifier 140 assigned thereto.

The profile server 116 may be configured to manage one or more user accounts associated with the individual unique identifiers 130. In some embodiments, the profile server 116 may also be configured to store information associated with each user account within the communication system 100. By way of non-limiting example, the profile server 116 may be configured to store an address book, a blocked caller list, a message history, text messages, video messages, a call history, personal user information, and combinations thereof, associated with each user account. In other embodiments, each of the communication devices 202 may be configured to store the information associated with the user account corresponding to the individual unique identifier 130 assigned thereto.

The servers 112 may be configured to enable the communication devices 202 to be associated with a user group 120. The user group 120 may, in some respects, function similarly to a separate communication device 102. For example, the user group 120 may be assigned a group unique identifier 140 and be associated with corresponding group account and group information, such as a group blocked caller list, a group message history, group text messages, group video messages, a group call history, a group address book (i.e., contact list), and combinations thereof, which may be stored on the profile server 116. Accessing any communication device 202 in the user group 120 may enable the user to access the group information, and communicate through the networks 110 using the group unique identifier 140 assigned to the user group 120. In some embodiments, group information may simply be a matter of the servers 112 being able to access individual communication device information that is stored for each communication device 202 to be shared with other communication devices 202 of the user group 120.

In some embodiments, where activity performed on a second communication device 202A₂ causes changes to the group information, the profile server 116 may communicate the changes in group information to the rest of the plurality of communication devices 202 belonging to the user group 120. Each of the plurality of communication devices 202 may be configured to periodically enter communication with the profile server 116 to receive updates. By way of non-limiting example, each of the plurality of communication devices 202 may be configured to enter communication with the profile server 116 approximately every five minutes (or other periodic interval) to receive updates. In some embodiments, updates may be event-driven such that certain events may cause the profile server 116 to broadcast updates to one or more of the communication devices 202. Initiation of these information updates and synchronizations may be performed by the servers 112 or the communication devices 202.

In some embodiments, the communication device 202 that is the creator of the user group 120 may have its information (e.g., lists) serve as the basis for the shared group information (e.g., shared lists). As discussed above, shared lists may include a blocked caller list, a group message history, group text messages, group video messages, a group call history, a group address book (i.e., contact list). As a result, each of these group lists may be shared and accessible (for viewing, editing, adding to, etc.) by each communication device 202. If a shared group list is changed, the change may be saved within the profile server 116. In addition, the profile server 116 may broadcast a notification to each of the communication devices 202 within the user group 120 that a change has been made to the shared group lists and that their local cache needs to be updated. The individual communication devices 202 may respond (e.g., either immediately or at their next scheduled interval) to receive the updated information to store in their local cache. In addition, there may be shared settings among group members that may be edited and shared in a similar manner. For example, shared settings may include the number of rings that occur before going to voice mail, a common voice mail message that is applied to all communication devices 202 rather than each communication device 202 having its own, among other similar settings.

In some embodiments, the profile server 116 and/or the individual communication devices 202 may retain a prior version of their individual lists and settings that existed before they joined the user group 120. As a result, when a communication device 202 leaves the user group 120, the communication device 202 may no longer have access to the shared group lists and settings and their lists may revert back to the individual state that the communication device maintained prior to joining the user group 120.

Figure 2:
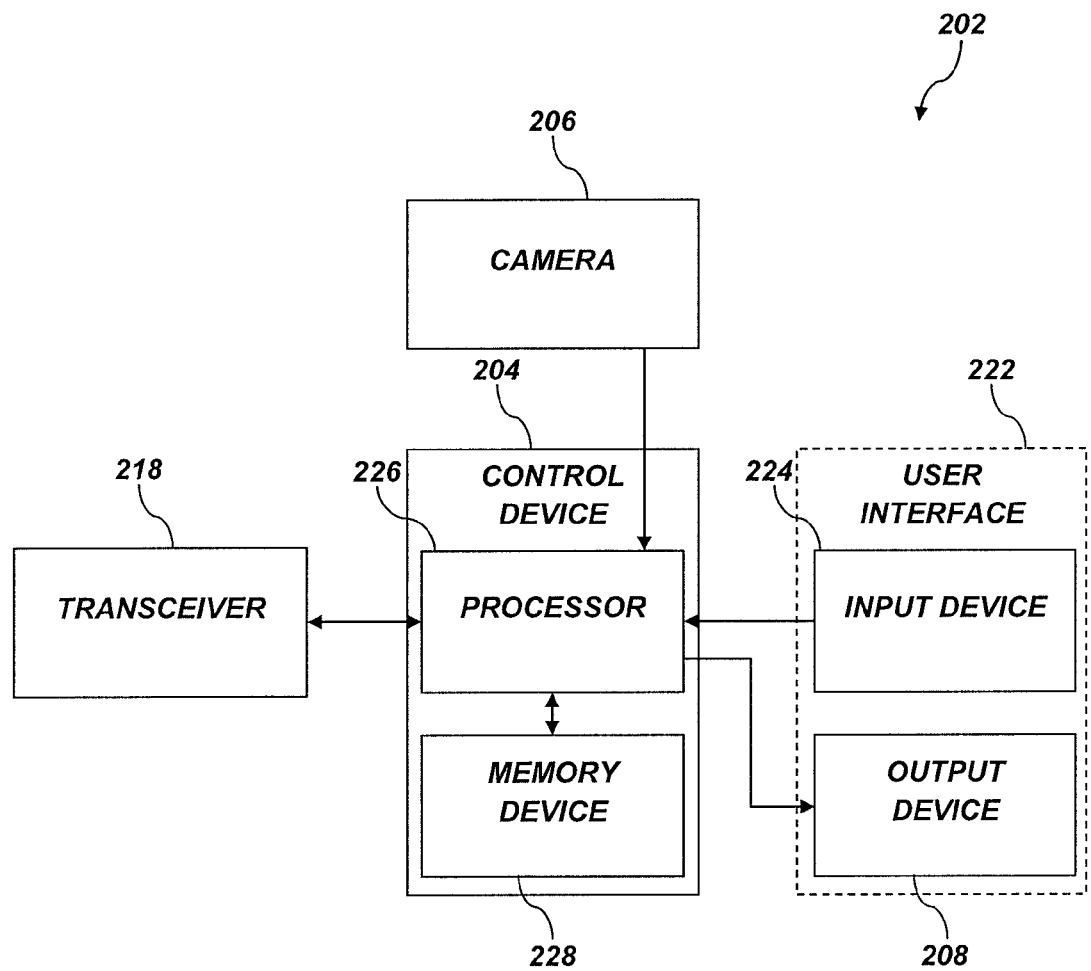
FIG. 2 is a simplified block diagram of a communication device according to some embodiments of the present disclosure.

FIG. 2 is a simplified block diagram of a computing device. The computing device may be a communication device 202 according to some embodiments of the present disclosure. The computing device may also be a server 112 according to some embodiments of the present disclosure. The computing device, whether a server 112 or a communication device 202 will be referred to in the description of FIG. 2 as a communication device 202. The communication device 202 may be one of the communication devices 202 shown in FIG. 1. The communication device 202 may include a control device 204 operably coupled to a camera 206, a transceiver 210, and a user interface 222. The control device 204 may include at least a processor 226 and a memory device 228. The processor 226 may be configured to execute commands stored on the memory device 228. By way of non-limiting example, the memory device 228 may include a computer readable media, such as, read only memory (ROM), random access memory (RAM), flash memory, and combinations thereof. The control device may be configured to control the camera 206, and the user interface 222. In addition, the control device may be configured to cause the transceiver 210 to transmit and receive data through the networks 110.

The camera 206 may include devices capable of capturing and converting visual images to data, as will be readily apparent to those skilled in the art. By way of non-limiting example, the camera may include a webcam, a camcorder device, a camera device integrated into the same enclosure as the control device 204, and other suitable devices. The camera 206 may be operably coupled to the control device 204 and configured to deliver the data to the control device 204.

The user interface 222 may include an input device 224 and an output device 208 operably coupled to the control device 204. By way of non-limiting example, the input device 224 may include a keyboard, a numerical keypad, a mouse, a touch-screen, a button array, a track pad, a remote control, motion sensors, orientation sensors, position sensors, a microphone, and combinations thereof. The input device 224 may be configured to receive commands from the user. Also by way of non-limiting example, the output device 208 may include any of a light-emitting diode (LED) array, a segmented display, a liquid crystal display, a cathode ray tube display, a plasma display, and other electronic displays. The output device 208 may also include other peripheral output devices, such as speakers and vibrators. In some embodiments, the input device 224 and the output device 208 may be integrated in the same device, such as, for example, a touch-screen display. In other embodiments, the input device 224 and the output device 208 may be implemented in separate devices, such as a keyboard and an LCD monitor, respectively.

The control device 204 may cause the output device 208 to display video images received as data at the transceiver 210 during a video call. The control device 204 may also cause the output device 208 to display options on the output device 208, such as through a graphical user interface displayed on the output device 208. In addition, the control device 204 may execute user commands received by the input device 224.

The user interface 222 may enable the user of the communication device 202 to take several types of actions. Some of these actions may include logging in to the communication device 202 as a specific user, creating a new user group 120, inviting another communication device 202 to join a user group 120, withdrawing a communication device 202 from the user group 120, place a video call to another communication device 202, accept an incoming call from another communication device 202, access account information associated with the communication device 202, access account information associated with a user group 120 with which the communication device 202 is associated, etc.

Figure 3A:
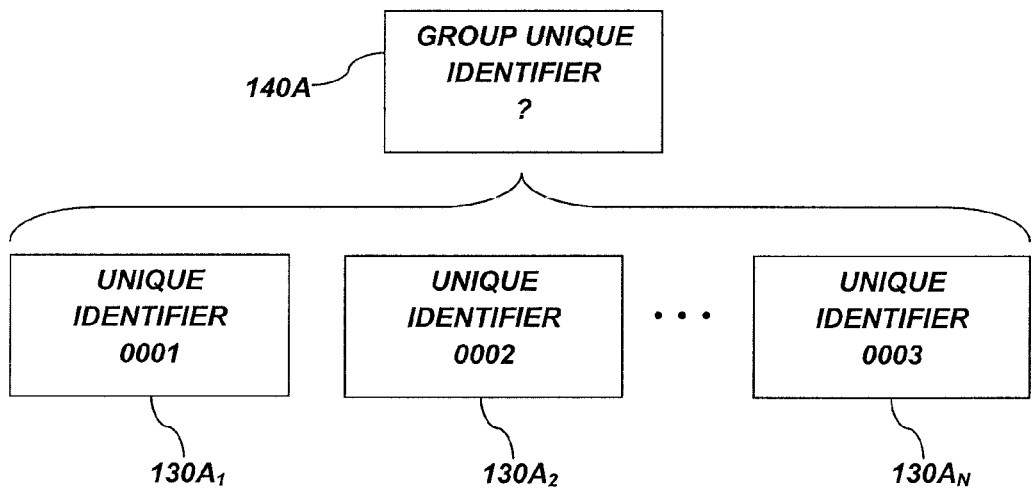
FIGS. 3A and 3B illustrate a method for assigning a group unique identifier to a user group according to an embodiment of the present disclosure.
Figure 3B:
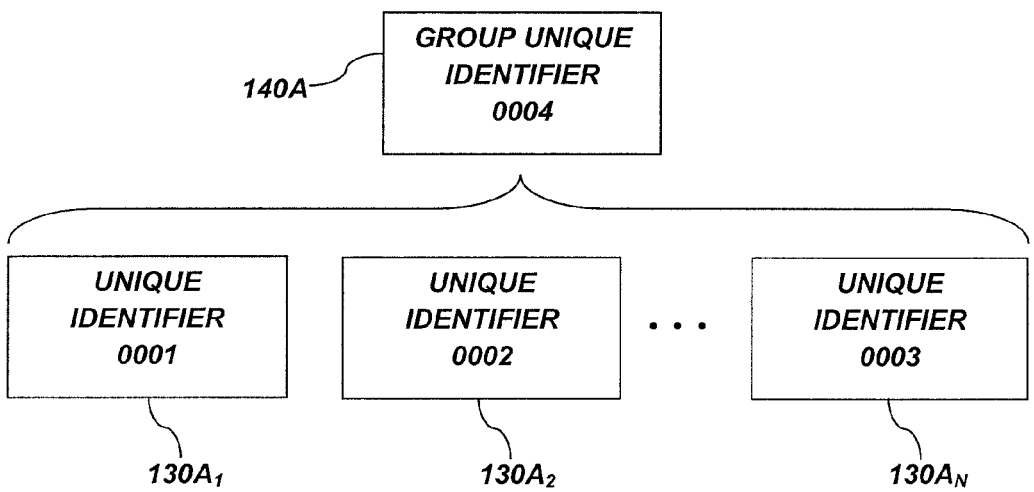

FIGS. 3A and 3B illustrate a method for assigning a group unique identifier 140 to a user group 120 according to an embodiment of the present disclosure. In particular, the first group 120A (FIG. 1) may receive a group unique identifier 140A to be associated with each of the communication devices 202 (FIG. 1) that are members of the first group 120A. As depicted in FIGS. 3A and 3B, the group unique identifier 140A may be a completely new identifier that was not previously an individual unique identifier $130A_1$, $130A_2$, $130A_N$ that is associated with one of the communication device of the first user group 120A.

For example, the first user may decide to group together a plurality of communication devices 202, wherein each of the plurality of communication devices 202 have already been assigned their own individual unique identifiers 130. For example, the first communication device $202A_1$ is associated with the first individual unique identifier $130A_1$ of "0001," the second communication device $202A_2$ is associated with the second individual unique identifier $130A_2$ of "0002," and the Nth communication device $202A_N$ is associated with the Nth individual unique identifier $130A_N$ of "0003."

As depicted in FIG. 3A, when the first user group 120A is created, the group unique identifier 140A may be unassigned. As depicted in FIG. 3B, the first user group 120A may be assigned a new group unique identifier 140A that was not previously assigned to any communication device 202 of the newly formed user group 120A. In other words, when the first user group 120A is created, the first user group 120A may be initialized with a new individual unique identifier $130A_1$ assigned thereto. For example, the group unique identifier 140A assigned to the user group 120A is "0004." The four digit unique identifiers 130, 140 are illustrated as a simple example of a unique identifier. As discussed above, the unique identifiers 130, 140 may be a telephone number, IP address, or other suitable identifier.

Figure 4A:
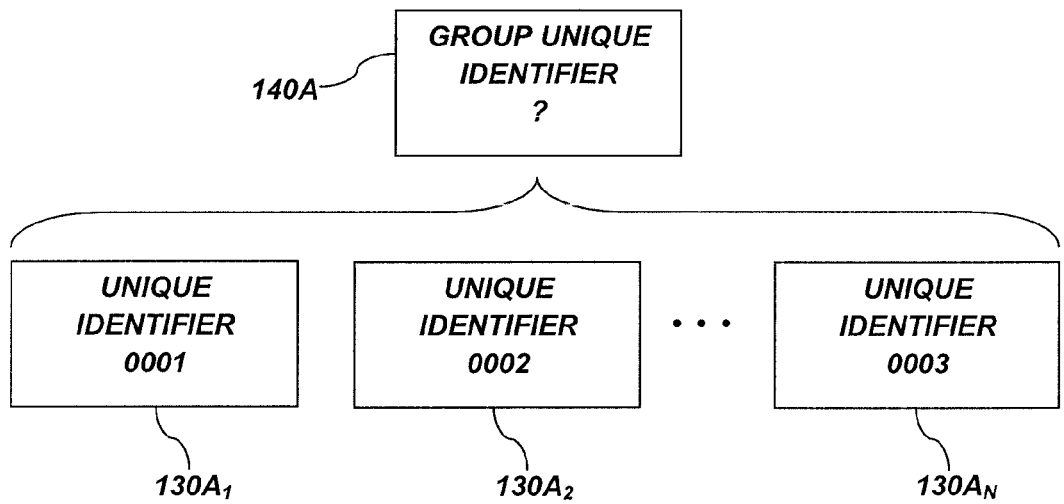
FIGS. 4A and 4B illustrate a method for assigning a group unique identifier to a user group according to another embodiment of the present disclosure.
Figure 4B:
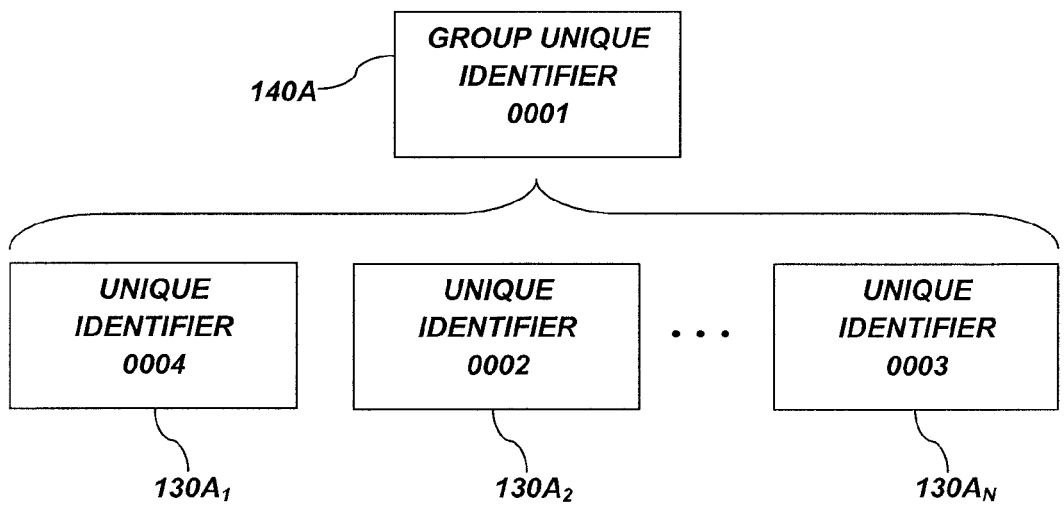

FIGS. 4A and 4B illustrate a method for assigning a group unique identifier 140 to a user group 120 according to another embodiment of the present disclosure. In particular, the first group 120A (FIG. 1) may receive a group unique identifier 140A to be associated with each of the communication devices 202 (FIG. 1) that are members of the first group 120A. As depicted in FIGS. 4A and 4B, the group unique identifier 140A may be a selected from an existing individual unique identifier 130A that was previously an individual unique identifier $130A_1$, $130A_2$, $130A_N$ that is associated with one of the communication of the first user group 120A.

For example, in some embodiments, the group unique identifier 140A assigned to the user group 120A may be selected from among the individual unique identifiers $130A_1$, $130A_2$, ... $130A_N$ that are part of the user group 120A. For example, the individual unique identifier $130A_1$ of the first communication device $202A_1$ may be "promoted" to be the group unique identifier 140A for the first user group 120A. As a result, the individual unique identifier $130A_1$ ("0001") previously associated with the first communication device $202A_1$ may be "sacrificed" and becomes the unique identifier 140A for the first user group 120A. In some embodiments, another individual unique identifier $130A_1$ ("0004") may be assigned to the first communication device $202A_1$ so that the first communication device $202A_1$ may remain associated with both the individual unique identifier $130A_1$ and the group unique identifier 140A associated with the first user group 120A.

When a user group 120 is established, the information (contacts, blocked calls, etc.) associated with the individual communication devices 202 may become group information (i.e., accessible through the other communication devices 202 of the user group 120), as desired by the user. In some embodiments involving a user group 120 initiated through promotion of an existing individual unique identifier 130 to become the group unique identifier 140 associated with the user group 120, only the information for that individual communication device 202 (e.g., communication device 202A₁) may be promoted to be group information.

Even though the establishment of the user group 120A is described with reference to FIGS. 3A, 3B, 4A, and 4B in terms of assigning the group unique identifier 140A to a newly established user group 120A, similar methods may be used to change the group unique identifier 140 after the user group 120 has been established. Therefore, the group unique identifier 140 assigned to the user group 120 may be changed by assigning a completely new group unique identifier 140 to the user group 120. In addition, the group unique identifier 140 may be changed by promoting one of the individual unique identifiers 130 to be the new group unique identifier 140 assigned to the user group 120, which may cause that a new individual unique identifier 130 be assigned to the corresponding communication device 202. In addition, the group unique identifier 140 associated with the user group 120 may be "demoted." In other words, the group unique identifier 140 assigned to the user group 120 may once again become associated with a corresponding first communication device 202, and a new group unique identifier 140 may be assigned (e.g., new issuance, promotion, etc.) to the user group 120, or the user group 120 may be dissolved.

Figure 5A:
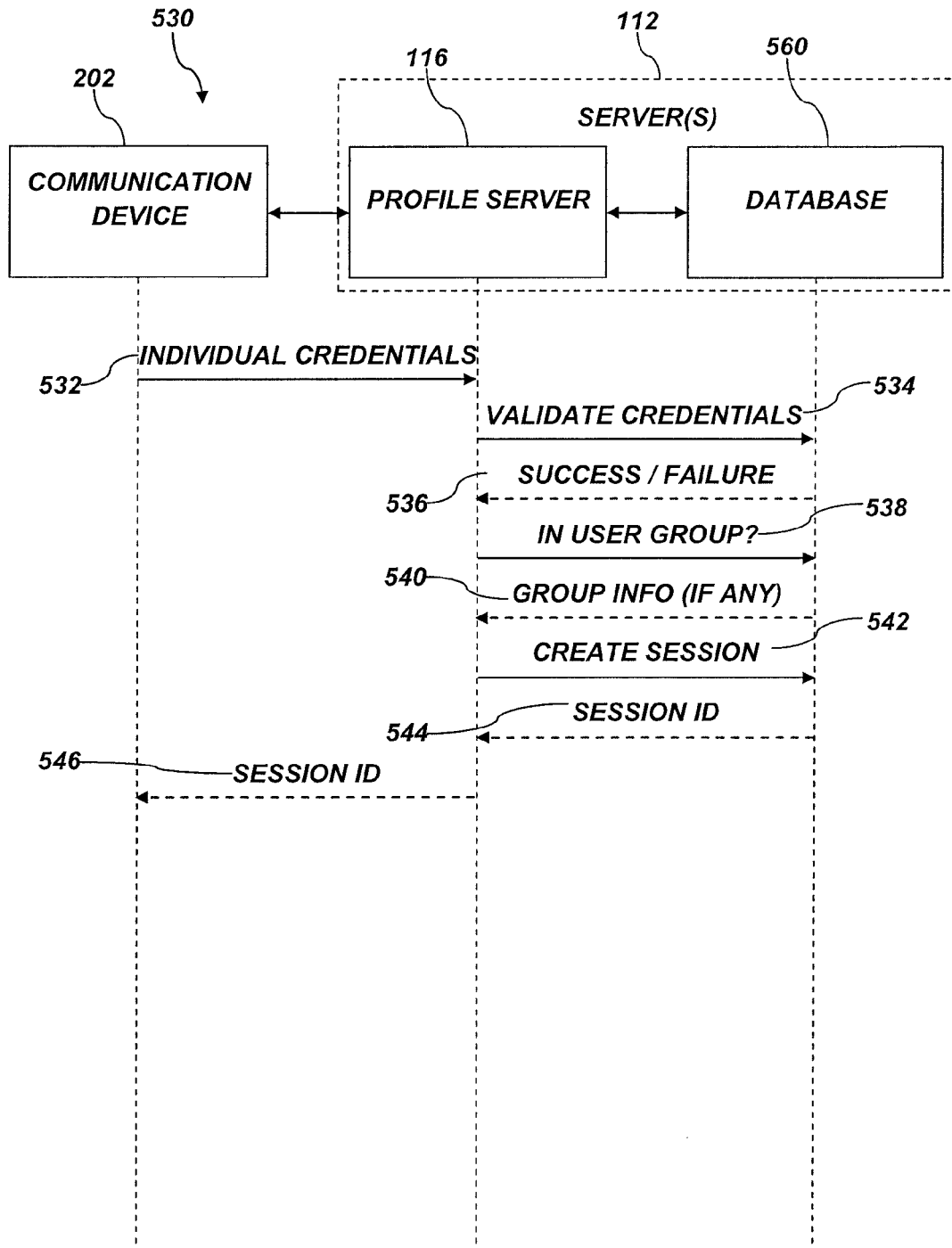
FIGS. 5A and 5B are data flow charts illustrating data flow between a communication device, a profile server, and a database associated with the profile server.
Figure 5B:
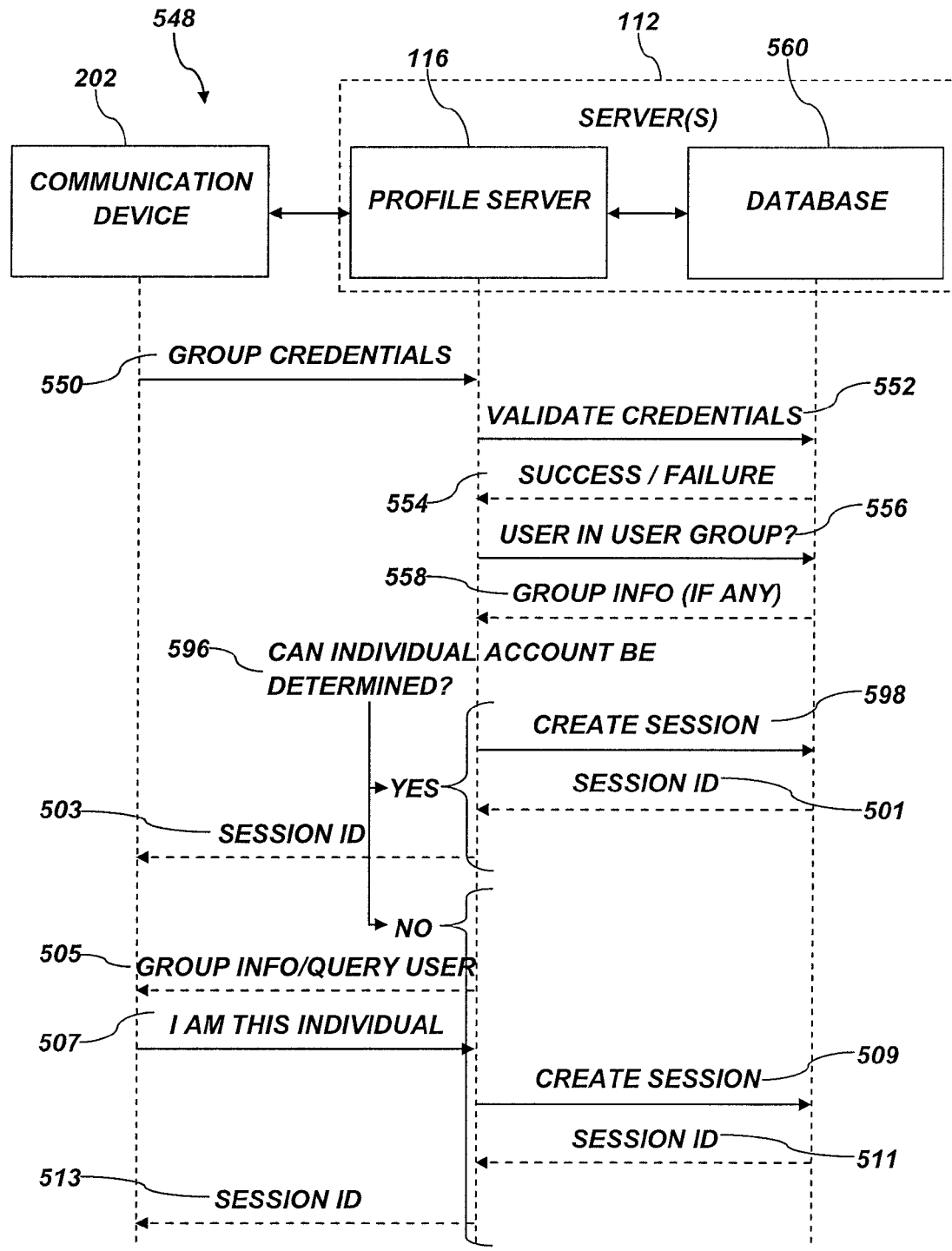

FIGS. 5A and 5B are data flow charts 530, 548 illustrating data flow between a communication device 202, a profile server 116, and a database 560 associated with the profile server 116. FIG. 5A illustrates data flow resulting from communication device 202 logging in with individual credentials associated with the communication device to access account information. FIG. 5B illustrates data flow resulting from the communication device 202 logging in with group credentials associated with a user group 120 to access account information, the communication device 202 belonging to the user group 120.

The database 560 may be configured to store individual account information corresponding to the communication device 202 and group account information corresponding to a user group 120 (FIG. 1) to which the communication device 202 belongs. Individual account information may include valid individual log in credentials (also referred to herein as "individual credentials"), user information, and individual communication device 202 information associated with the communication device 202. Group account information may include valid group log in credentials (also referred to herein as "group credentials"), user information, and group information associated with the user group. The group account information may also include information corresponding to a plurality of communication devices 202 that belong to the user group 120.

Referring to FIG. 5A, the user of the communication device 202 may provide individual credentials through the user interface 222 (FIG. 2) of the communication device 202. By way of non-limiting example, the individual credentials may be a user name and password. In some embodiments, the user name may be the individual unique identifier 130 assigned to the communication device 202. Other individual credentials, such as for example a user selected user name, are also contemplated.

At operation 532, the communication device 202 may send the individual credentials through the networks 110 (FIG. 1) to the profile server 116. At operation 534, the profile server 116 may send a validation request to the database 560 to validate the individual credentials provided by the user against the valid individual credentials stored in the database 560.

At operation 536, the database 560 may send a success/failure signal to the profile server 116 indicating either success or failure of the log in attempted by the user of the communication device 202. If the individual credentials provided by the user of the communication device 202 do not match those stored in the database 560, then the success/failure signal sent to the profile server 116 may indicate failure of the log in attempt. As a result, the user may not be given access to account information. If, on the other hand, the log in credentials provided by the user of the communication device 202 match those stored on the database 560, the success/failure signal sent to the profile server 116 may indicate a successful log in attempt. As a result, the user may be given access to the individual account information.

In some embodiments, the profile server 116 may also cause the communication device to give the user access to the group account information along with the individual account information if the communication device 202 belongs to the user group 120. If, however, the communication device 202 is not associated with the user group 120, then the profile server 116 may cause the communication device 202 to only access the individual account information. In other embodiments, logging in with the individual credentials may exclude the communication device 202 from accessing the group account information regardless of whether the communication device 202 belongs to the user group.

If the log in attempt succeeds, at operation 538 the profile server 116 may query the database 560 to determine whether the communication device 202 belongs to a user group 120. At operation 540, the database 560 may send the group account information to the profile server 116 if the communication device 202 is part of the user group 120. If, on the other hand, the communication device 202 is not part of the user group 120, the database 560 may only send the individual account information, and not the group account information.

The profile server 116 may create a session and cause a session identifier to be stored on the database 560 at operation 542. At operation 544, the database may send the session identifier to the profile server 116. At operation 546, the profile server 116 may send the session identifier through the networks 110 to the communication device 202, and the user may operate the communication device 202 as both the communication device 202 and the user group 120 if the communication device 202 belongs to the user group 120, and only as the communication device 202 if the communication device 202 does not belong to the user group 120.

Referring to FIG. 5B, the user of the communication device 202 may provide group credentials through the user interface 222 (FIG. 2) of the communication device 202. The group credentials may include a user name and password. In some embodiments, the user name may be the group unique identifier 140 assigned to the communication device 202. Other group credentials, such as for example a user selected username, are also contemplated.

At operation 550, the communication device 202 may send the group credentials through the networks 110 (FIG. 1) to the profile server 116. At operation 552, the profile server 116 may send a validation request to the database 560 to validate the group credentials provided by the user against the valid group credentials stored in the database 560.

At operation 554, the database 560 may send a success/failure signal to the profile server 116 indicating either success or failure of the log in attempted by the user of the communication device 202. If the group credentials provided by the user of the communication device 202 do not match those stored in the database 560, then the success/failure signal sent to the profile server 116 may indicate failure of the log in attempt. As a result, the user may not be given access to account information. If, on the other hand, the group credentials provided by the user of the communication device 202 match those stored on the database 560, the success/failure signal sent to the profile server 116 may indicate a successful log in attempt. As a result, the user may be given access to the group account information.

If the log in attempt succeeds, at operation 556 the profile server 116 may query the database 560 to determine whether the communication device 202 belongs to a user group 120. At operation 558, the database 560 may send the group account information to the profile server 116 if the communication device 202 is part of the user group 120. If, on the other hand, the communication device 202 is not part of the user group 120, the database 560 may not send the group account information.

Once the user succeeds in logging in with group credentials, at operation 596 the profile server 116 may attempt to determine which individual account information to give the communication device 202 access to along with the group account information. If the profile server 116 succeeds in determining which individual account information to provide, the profile server 116 may create a session and cause a session identifier to be stored on the database 560 at operation 598. At operation 501, the database may send the session identifier to the profile server 116. At operation 503, the profile server 116 may send the session identifier through the networks 110 to the communication device 202, and the user may operate the communication device 202 as both the communication device 202 and the user group 120.

Returning to operation 596, if the profile server cannot determine which individual account information to provide to the user, at operation 505 the profile server may send the group account information to the communication device 202 and query the user to indicate which individual account information to provide. At operation 507, the user may indicate the individual account information that should be provided, and the indication may be sent to the profile server 116. At operation 509, the profile server may create a session, and cause a session identifier to be stored in the database 560. The database 560 may send the session identifier to the profile server 116 at operation 511, and the profile server 116 may send the session identifier through the networks 110 to the communication device 202 at operation 513. The user may then operate the communication device 202 as both the communication device 202 and the user group 120. As a result, using a group unique identifier 140 to log in may also cause the communication device 202 to communicate with the one or more servers 112 responsive to being addressed by the individual unique identifier 130 assigned to the communication device.

Figure 6:
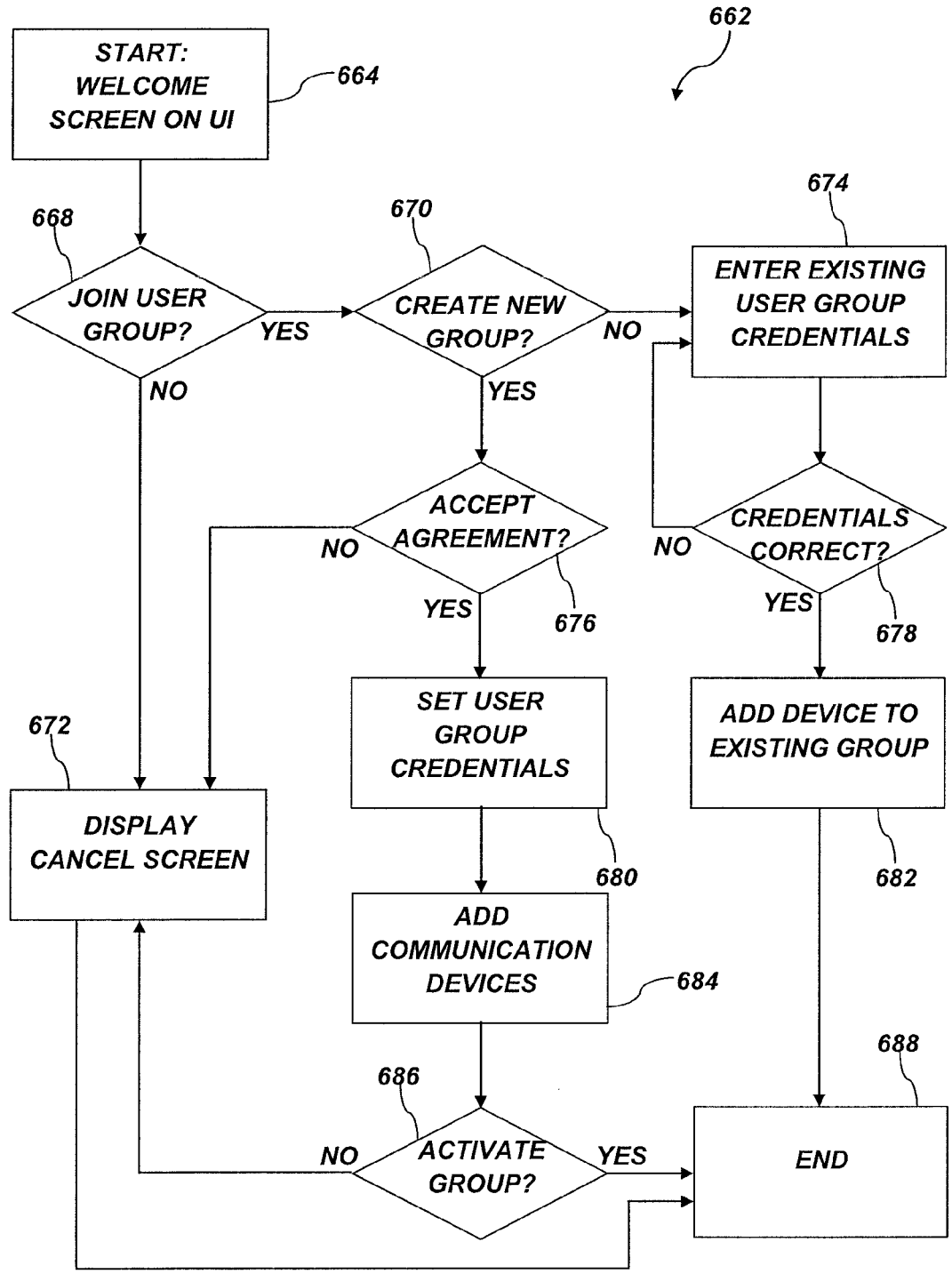
FIG. 6 is a flowchart of a method for adding a communication device to a new or existing user group.

FIG. 6 is a flowchart 662 of a method for adding a communication device 202 (FIGS. 1 and 2) to a new or existing user group 120. At operation 664, the user interface 222 (FIG. 2) may display a welcome screen to a user of the communication device 202. At operation 668, the user interface 222 may display an option to join a user group 120 (FIG. 1). If the user rejects the option to join a user group 120, at operation 672 the user interface 222 may display a cancel screen, and at operation 688 the method may end. If the user accepts the option to join a user group 120, at operation 670 the user interface 222 may provide an option to create a new user group 120.

If the option to create a new user group 120 is accepted, at operation 676 the user interface 222 may display an agreement delineating any terms required for creating the new user group 120, and an opportunity is provided to accept or reject the agreement. If the agreement is rejected, at operation 672 the user interface 222 may display the cancel screen, and at operation 688 the method may end. If, on the other hand, the agreement is accepted, at operation 680 the user interface 222 may prompt the user to set group credentials, including, for example, a group unique identifier 140 (FIG. 1) and a password. At operation 684, the user interface 222 may prompt the user to add other communication devices 202 to the new user group 120. The profile server 116 (FIG. 2) may send invitations to join the new user group 120 to any communication devices 202 added by the user. At operation 686, the user interface 222 may provide the user an option to activate the new user group 120. If the user elects to activate the new user group 120, the new user group 120 may be activated, and at operation 688 the method may end. If the user elects not to activate the new user group 120, at operation 672 the cancel screen may be displayed, and at operation 688, the method may end.

If the option to create a new user group 120 is denied, the user interface 222 may prompt the user to enter existing user group 120 credentials at operation 674. At operation 678, if the credentials are not correct, the user interface 222 may once again prompt the user to enter existing user group 120 credentials at operation 674. At operation 678, if the credentials are correct, the communication device 202 may be added to the existing user group 120 at operation 682. At operation 688 the method may end.

Figure 7:
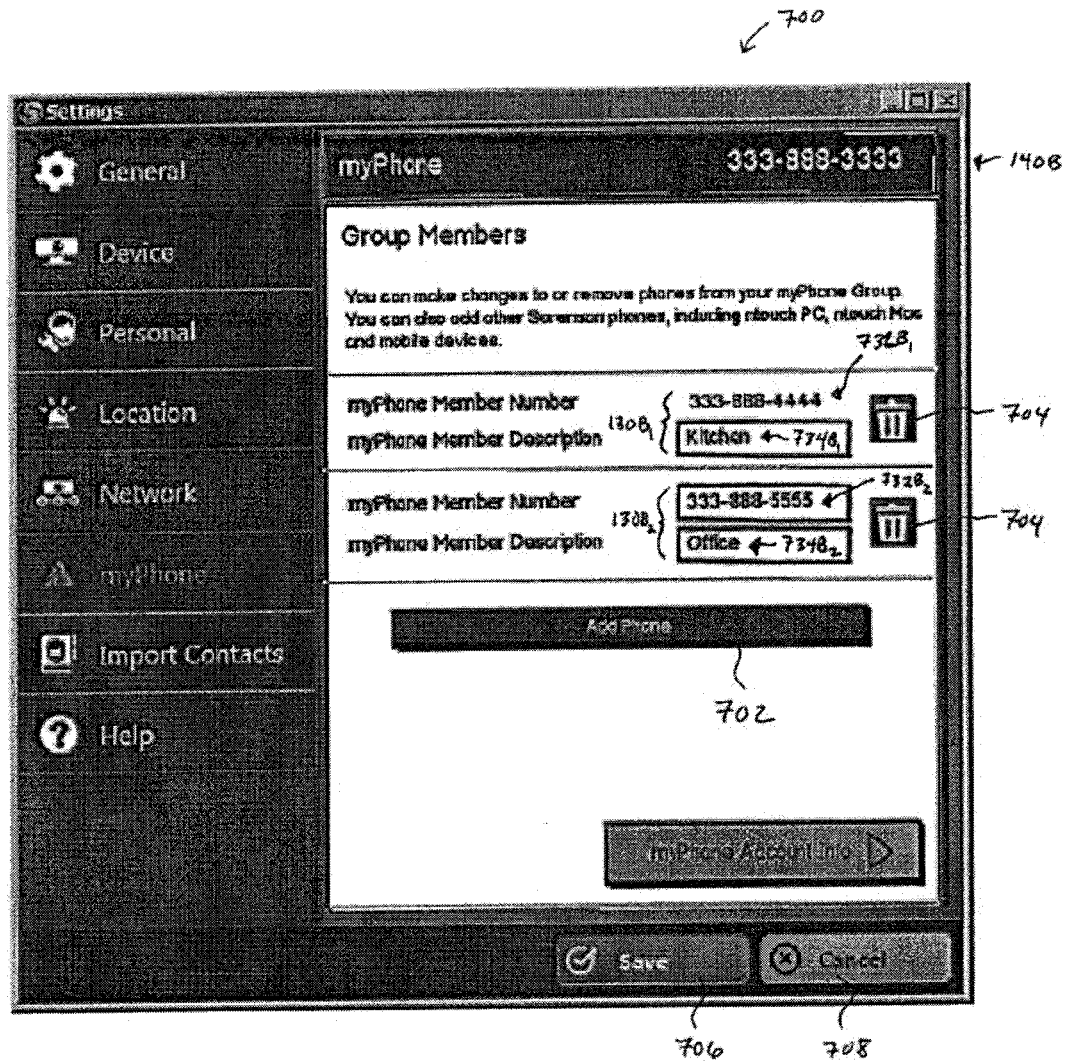
FIG. 7 is a screenshot of a graphical user interface that may be used to add and/or update information related to an individual device, to members of the group, and other general group information.

FIG. 7 is a screenshot of a graphical user interface 700 that may be used to add and/or update information related to an individual device, to members of the group, and other general group information. For example, through the graphical user interface 700, members of a user group may be displayed with certain individual and group information. In the example given for FIG. 7, the second user group 120B (FIG. 2) and its accompanying communication devices 202B$_1$, 202B$_2$ (FIG. 2) are used for the discussion.

The group unique identifier 140B may be displayed by the graphical user interface 700 for the user group 120B. In addition, the graphical user interface 700 shows information for the first group member corresponding to a first communication device 202B$_1$. The information includes individual unique identifier 130B$_1$. The first individual unique identifier 130B$_1$ may include a first member number 732B$_1$ and a first member description 734B$_2$. The graphical user interface 700 also shows information for a second group member corresponding to a second communication device 202B$_2$. The information includes unique individual identifier 130B$_2$, which may include a second member number 732B$_2$ and a second member description 734B$_2$.

Thus, each unique individual identifier 130B$_1$, 130B$_2$ may have more than one identifier associated with it. The member number 732B$_1$, 732B$_2$ may be unique as to all other communication devices 202 within the network 110. For example, no two communication devices 202 within the network 110 may have the same member number 732B$_1$, 732B$_2$. In other words, in this example, the member number 732B$_1$, 732B$_2$ may be a network-wide individual unique identifier. The member description 734B$_1$, 734B$_2$ may be unique as to all other communication devices 202B$_1$, 202B$_2$ within the individual user group 130B. For example, no two communication devices 202B$_1$, 202B$_2$ within the same user group 130 may have the same member description 734 in the network 110 (whether in the same user group 130 or not). However, it may be possible for multiple communication devices 202 to have the same member description 734 within the network 110 so long as the communication devices 202 are not members of the same user group 130. In other words, the member description $734B_1$, $734B_2$ may be a group-wide individual unique identifier.

The member number $732B_1$, $732B_2$ and/or the member description $734B_1$, $734B_2$ may be entered by a user into a field of the graphical user interface 700 when adding a new group member's information or updating a group member's information. The member number $732B_1$, $732B_2$ may have a numeric format, such as a traditional phone number (e.g., "333-888-444," "333-888-555," etc.). These numbers may be assigned by the administrator of the network 110, by an agency, or other entity to ensure that each communication device 202 of the network 110 has a different number. The member description $734B_1$, $734B_2$ may have an alphanumeric format, such as a word or phrase (e.g., "Kitchen," "Office," etc.). The member description $734B_1$, $734B_2$ may be assigned by the user herself in a manner that has meaning to the user. For example, the member description $734B_1$, $734B_2$ "Kitchen" or "Office" may be chosen by the user to indicate the location of the communication device $202B_1$, $202B_2$. Other descriptions may be chosen, such as "mobile," "John," "wife," etc. to have meaning to the user for a particular communication device 202. As discussed above, a user group 120 may not necessarily be a group of communication devices owned and controlled by the same user. For example, the user group 120 may be a group of co-workers within a team or practice group, such as a technical support team in a workplace. Thus, the member descriptions 734 may be the names of the co-workers (e.g., "Jeff," "Mary," etc.) that have been grouped together in a user group 120.

In addition, a communication device's membership in the user group 120B itself may be edited through the graphical user interface 700. For example, a communication device 202 (e.g., phone) may be added as a member to the group by selecting the "add phone" button 702 displayed. Selecting the add phone button 702 may cause new fields to be displayed (either as part of the graphical user interface 700 or as a pop-up window) to enter in information (e.g., a member number 732 and/or member name 734) for the communication device 202 to be added as a member of the group. In addition, group members may be removed from the group by selecting a "delete" button 704 associated with the group member. Changes to the information displayed in the graphical user interface 700 may be saved by selecting the "save" button 706 or discarded by selecting the "cancel" button 708.

In summary, there may be a plurality of unique identifiers associated with each communication device 202. As discussed above, the individual unique identifiers 130 may include a network-wide individual unique identifier (e.g., member number 732) as well as a group-wide individual unique identifier (e.g., member description 734). Each communication device 202 may also be associated with a group unique identifier 140 associated with a particular user group 120. As a result, there are many ways in which a communication device 202 may be called—by those outside the user group 120 (i.e., from the population at large) as well as by those within the user group 120.

Non-group members and group members alike may call a communication device 202 by using its network-wide individual unique identifier. In the example shown in FIG. 7, the member number 732B1, 732B2 is the network-wide individual unique identifier. However, trying to call a user that owns a number of communication devices 202 may be difficult to remember each network-wide individual unique identifier or it may be burdensome to call each communication device individually until the user answers.

As discussed above, a communication device 202 may be called by an outsider (i.e., a non-group member) by calling the group unique identifier 140. In the example shown in FIG. 7, the group unique identifier 140B for the user group 120B is a number "333-888-3333" having a similar format as a traditional telephone number. The numerical format is used herein as an example, however, and various formats are contemplated as a unique way to identify the user group 120B to be distinguishable from other user groups (e.g., user group 120A) within the network 110. When a non-group member calls the group unique identifier 140B, each member of the user group 120B may be called and connected to the incoming call.

A user may call the other communication devices 202 of its user group 120 using the group unique identifier 140. When a group member calls its own group unique identifier 140, each of the other members of the user group 120 may be called and connected to the incoming call. Thus, the communication device 202 may not issue a busy signal when it calls its own group unique identifier 140. As a result, the user may call the other communication devices 202 within its user group 120 without knowing the individual unique identifiers 130.

In addition, the user may call the other communication devices 202 of its user group 120 using the group-wide unique identifier (e.g., the member description 734 in this example). For example, when a group member places a call, the user may select a member description 734 for a communication device 202 from within its own user group 120. As a result, the user may call the other communication devices 202 within its user group 120 without knowing the individual unique identifiers 130. Selecting the member description 734 may include entering the member description, for example, by typing or speaking the member description 734 when placing the call. In some embodiments, the graphical user interface 700 may present the member descriptions 734 that are available for all members of the user group 120, and from which the user may select. For example, a drop down menu or other list may be displayed for the user to select a member description 734 from among all member descriptions 734 of the user group 120.

In another embodiment, non-group members may use the member description 734 to call an individual communication device 202. However, because the member description 734 is only a group-wide individual unique identifier rather than a network-wide individual unique identifier, there may be no guarantee that another communication device within the network 110 does not have the same member description 734. For example, multiple groups may have communication devices that have been given the member description 734 of "Kitchen" or "Office." Therefore, the user may need to further limit the call parameters to include the group unique identifier 140. For example, if the outside user knows the unique group identifier 140B and the individual member description $734B_1$ for the particular communication device $202B_1$, the outside user may enter both identifiers as an alternative way to call an individual communication device $202B_1$ rather than calling the communication devices of the entire group. Such a situation may be desirable, for example, if a non-group member may know want to call another user's specific communication device (e.g., such as their mobile phone or the phone in the user's kitchen) but does not know the member number 732B$_1$ (which is the network-wide individual unique identifier in this example) for that particular communication device 202B$_1$. If, however, the non-group member were to know the user's group unique identifier 140B and their member description 734B$_1$ (which is the group-wide individual unique identifier in this example), the non-group member may be able to call the individual communication device 202B$_1$ without knowing the exact member number (e.g., individual phone number).

Figure 8:
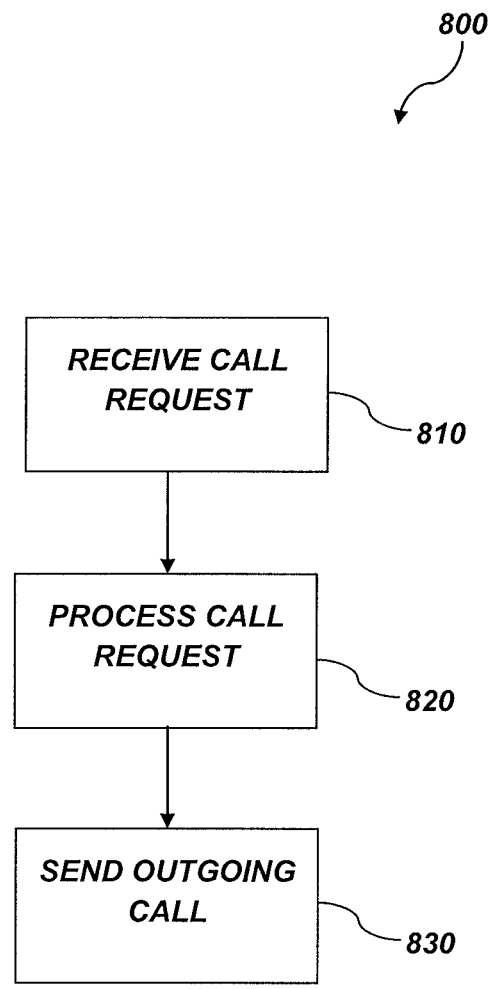
FIG. 8 is a flowchart illustrating a method for establishing communication between a plurality of communication devices according to an embodiment of the present disclosure.

FIG. 8 is a flowchart 800 illustrating a method for establishing communication between a plurality of communication devices according to an embodiment of the present disclosure. When calls are initiated by a user, at operation 810, the call request may received by the communication 202 received by the communication device to be sent to the call routing server 114 (FIG. 1). The call request may include the user entering a unique identifier for the desired communication device(s) 202 with which communication is desired. The unique identifier may include a unique individual identifier 130 or a group unique identifier 140. As discussed above, the unique individual identifier 130 may include a network-wide individual unique identifier (e.g., member number 732) or a group-wide individual unique identifier (e.g., member description 734).

At operation 820, the communication device 202 may process the call request and determine which communication device(s) 202 are associated with the unique identifier of the call request. For example, for a group unique identifier 140, a plurality of communication devices 202 that are part of a common user group 120 associated with the group unique identifier 140 may receive the outgoing call. In that situation, the communication device 202 may send the outgoing call including the group unique identifier 140 to the call routing server 114 for routing to the appropriate communication devices 202 that are part of the corresponding user group 120, at operation 830.

For the individual unique identifier 130 (e.g., group-wide or network-wide), an individual communication device 202 associated with the individual unique identifier 130 may receive the outgoing call. For a network-wide individual unique identifier 130, the communication device 202 may send the outgoing call including the network-wide individual unique identifier 140 to the call routing server 114 for routing to the appropriate communication devices 202 corresponding to the network-wide individual unique identifier 140, at operation 830. For a group-wide individual unique identifier 130, the communication device 202 may first translate the group-wide individual group identifier 130 to a network-wide individual unique identifier 130 and send the outgoing call including the translated network-wide individual unique identifier 130 to the call routing server 114 for routing to the appropriate communication devices 202 corresponding to the individual unique identifier 130, at operation 830. As an example, the translation may occur from retrieving the network-wide individual unique identifier from the communication devices cache of group member information, or through other methods. In some embodiments, the communication device 202 may send the group-wide individual unique identifier 130 to the call routing server 114, and the call routing server 114 may perform the translation to the network-wide individual unique identifier.

With the outgoing call, the call routing server 114 may also send the unique identifier information of the communication device 202 that initiated the call request. For example, if the communication device 202 that initiated the call request is calling a communication device 202 that is not a member of the same user group 120, the group unique identifier 140 (if any) associated with the initiating communication device 202 may be sent to be displayed (e.g., as caller ID) by the receiving communication device 202. As a result, the recipient may be more likely to return the call by calling the group unique identifier 140 and calling all communication devices 202 of the user group 120 rather than an individual communication device 202.

If the communication device 202 that initiated the call request is calling a member of its own user group 120, the individual unique identifier 130 (e.g., member number 732 or member description 734) may be sent to be displayed by the receiving communication device 202. As a result, the recipient may be more likely to return the call by calling the individual communication device 202 within the user group 120 rather than all group members. Of course, the user may still decide to return the call by calling the group unique identifier 140 if the user desires all communication devices 202 of the group to be reached.

Figure 9:
FIG. 9 is a screenshot of a contact list for a communication device according to an embodiment of the present disclosure.

FIG. 9 is a screenshot of a contact list 900 for a communication device 202 according to an embodiment of the present disclosure. The contact list 900 displays a list of contacts (e.g., "Annie Oakley," "B F Pierce," etc.). These contact names may be entered locally by a user for the communication device 202. As contact lists may be shared among other group members, the contact entries of the contact list 900 may be shared with the other communication devices 202 of common user group 120. Contact entries for fellow group members may be displayed on the contact list 900 with the name entered by the user, but also the member description 734. The member description 734 may be managed by the group administrator rather than locally by the user.

Figure 10:
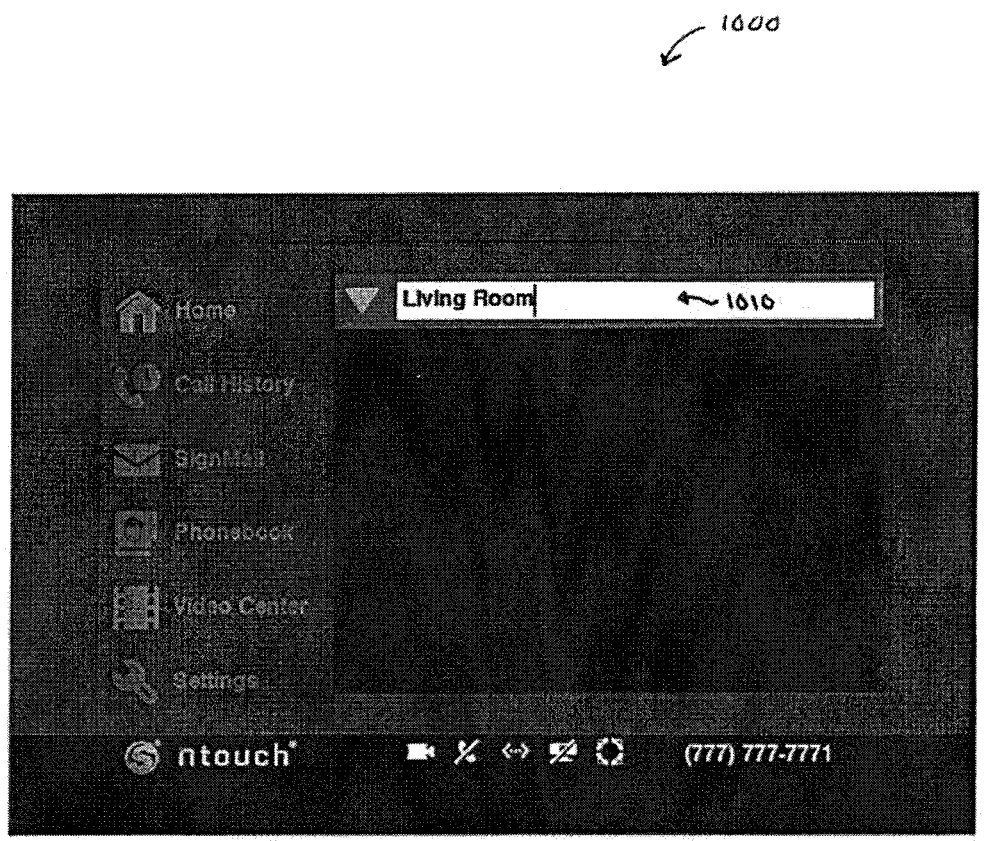
FIG. 10 is a screenshot of a calling screen for a communication device according to an embodiment of the present disclosure.

FIG. 10 is a screenshot of a calling screen 1000 for a communication device 202 according to an embodiment of the present disclosure. The calling screen 1000 may be accessed by a user when the user desired to place an outgoing call. The calling screen 1000 may include a call destination entry field 1010 for the user to enter the unique identifier of the communication device 202 that the user desires to call. The unique identifier entered by the user may include a group unique identifier 140 to call all communication devices 202 of a user group 120. The user may call an individual communication device 202 by entering a network-wide individual unique identifier (e.g., the member number 732). The user may also call an individual communication device 202 within its common group by entering a group-wide individual unique identifier (e.g., the member description 734). As shown in FIG. 10, the member description "Living Room" may be entered and called. As a result, an outgoing call may be placed to the communication device 202 within the user's user group that has the member description of "Living Room." As a result, the user may not need to know the network-wide unique individual identifier to place a call to an individual communication device 202 within its own group.

Figure 11:
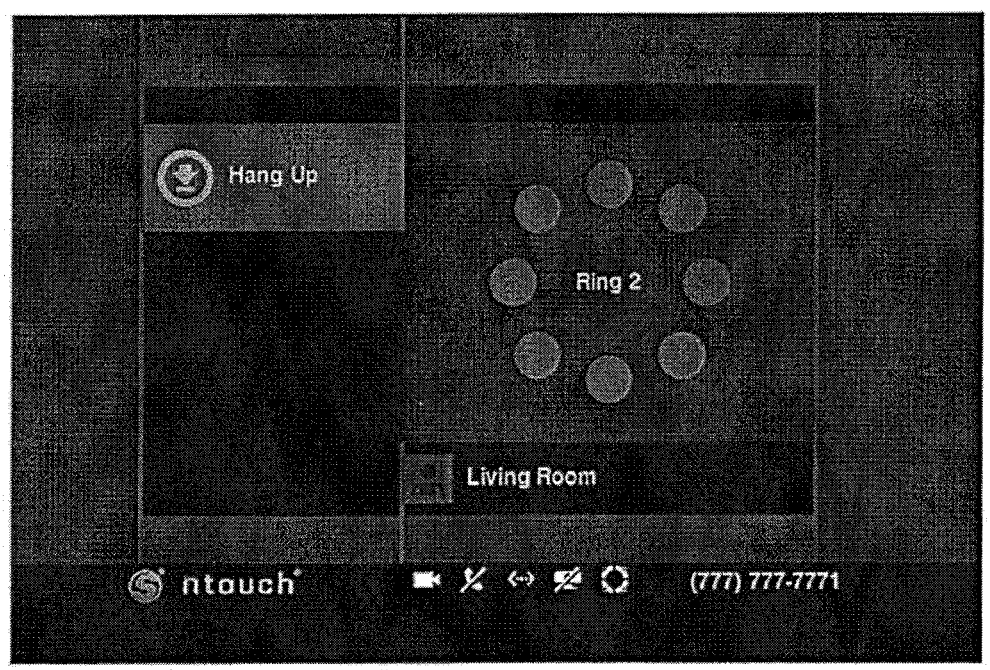
FIG. 11 is a screenshot of an outgoing call screen for a communication device according to an embodiment of the present disclosure.

FIG. 11 is a screenshot of an outgoing call screen 1100 for a communication device 202 according to an embodiment of the present disclosure. The outgoing call screen 1100 may appear on the communication device 202 when the user is sending an outgoing call while waiting for the recipient to answer the call. The outgoing call screen 1100 may display the unique identifier used for the communication device 202 to which the outgoing call is being sent. As shown in FIG. 11, the member description "Living Room" is displayed—indicating which particular communication device 202 within the user group 120 is being sent the call.

Figure 12:
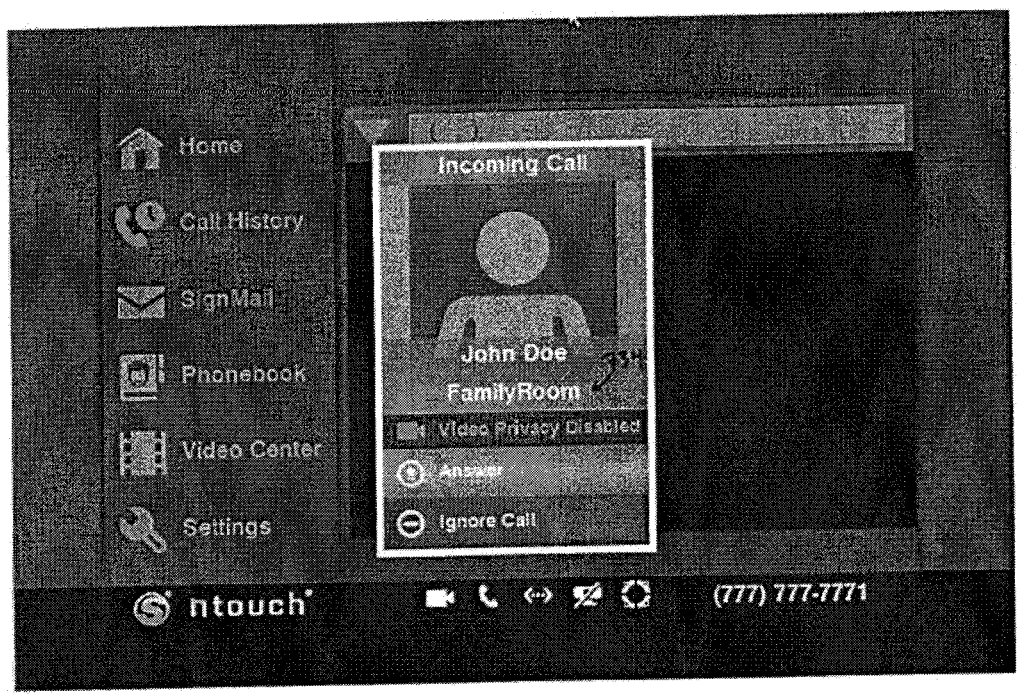
FIG. 12 is a screenshot of an incoming call screen for a communication device according to an embodiment of the present disclosure.

FIG. 12 is a screenshot of an incoming call screen 1200 for a communication device 202 according to an embodiment of the present disclosure. The incoming call screen 1200 may appear on the communication device 202 when the user is receiving an incoming call. The incoming call screen 1200 may have caller identification of the communication device 202 that placed the call. When a call originates from a communication device 202 that is part of a user group 202, the group unique identifier 140 (i.e., shared outbound identity) for the user group 120 may be displayed. When a call originates from a communication device 202 that is not part of a user group 120, the network-wide individual unique identifier for the communication device 202 may be displayed. When a call originates from a communication device 202 that is part of the same user group 120 as the receiving communication device 202, the group-wide individual unique identifier (e.g., member description 734) for the communication device 202 may be displayed. As shown in FIG. 12, the member description "FamilyRoom" is displayed—indicating which particular communication device 202 within the user group 120 is initiating the call.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A video communication system, comprising:
  a server hardware device configured to:
    associate a plurality of video communication devices with each other in a user group that is associated with a single hearing-impaired user, wherein each video communication device of the plurality of video communication devices is associated with each of the following unique identifiers:
      a group-wide individual unique identifier that is unique as to other members of the same group;
      a network-wide individual unique identifier that is unique as to other video communication devices of the network; and
      a group unique identifier that is shared with the plurality of video communication devices of the user group; and
    establish communication between a first communication device and a second communication device in response to the server hardware device receiving an initial call request from the first communication device including at least one of the unique identifiers corresponding to the second video communication device from the first communication device, wherein:
      receiving the initial call request including the group unique identifier causes the server hardware device to attempt to establish communication with the plurality of video communication devices of the same group responsive to the initial call request;
      receiving the initial call request including the network-wide individual unique identifier causes the server hardware device to attempt to establish communication with the associated individual video communication device responsive to the initial call request;
      receiving the initial call request including the group-wide individual unique identifier causes the server hardware device to attempt to establish communication with the associated individual video communication device when the first communication device and the second communication device are members of the same user group; and
    route the communication through a video relay service for providing translation services for hearing-impaired users responsive to determining that one of the parties to the communication is a hearing-capable user and another party to the communication is a hearing-impaired user;
  wherein the group-wide individual unique identifier is translated to the network-wide individual unique identifier by either the first communication device retrieving group information maintained by the server hardware device and performing the translation using the group information prior to sending the initial call request or by the server hardware device receiving the group-wide individual unique identifier from the first communication device and performing the translation using the group information maintained by the server hardware device and shared with other communication devices of the same user group.

2. The video communication system of claim 1, wherein the server hardware is configured to establish communication between the first communication device and the second communication device in response to receiving the initial call request from the first communication device including a combination of the group unique identifier and the group-wide individual unique identifier of the second communication device when the first communication device and the second communication device are not members of the same user group such that the second communication device is the only communication device of the user group that rings.

3. The video communication system of claim 1, wherein the server hardware device is configured to send at least one of the group-wide individual unique identifier and the network-wide individual unique identifier of the first communication device to the second communication device to be displayed by the second communication device.

4. The video communication system of claim 1, wherein receiving the group unique identifier attempts to establish communication with all other video communication devices of the user group without receiving a busy signal responsive to receiving the initial call request when the first communication device places the initial call request using its own group unique identifier.

5. The video communication system of claim 1, wherein the server hardware device includes:
  a call routing server configured to establish communication between the first communication device and at least the second communication device through the relay service; and
  a profile server configured to manage one or more user accounts associated with each video communication device of the plurality of video communication devices.

6. The video communication system of claim 1, wherein the group-wide individual unique identifier includes a member description having an alphanumeric format and the network-wide individual unique identifier includes a member number having a numeric format.

7. A video communication system, comprising:
a plurality of video communication devices configured for use by hearing-impaired users;
a server hardware device configured to coordinate communication sessions between the plurality of video communication devices with communication devices configured for use by hearing-capable users through a video relay service providing translation services for at least some of the communication sessions, wherein the server hardware device is configured to enable:
each video communication device of the plurality of video communication devices to be associated with an individual unique identifier that is unique to an individual video communication device across the video communication system;
at least some of the video communication devices of the plurality of video communication devices to be associated with a group unique identifier that is shared by video communication devices that are part of a common user group of video communication devices for a single hearing-impaired user; and
at least some of the video communication devices of the plurality of video communication devices to be associated with a group-wide unique identifier that is unique to an individual video communication device across its user group; and
translation of the group-wide unique identifier to the network-wide individual unique identifier by either the video communication device using group information maintained by the server hardware device prior to sending an initial call request or by the server hardware device using the group information responsive to receiving the group-wide individual unique identifier from the first communication device, wherein the group information is shared by other communication devices of the same user group.

8. The video communication system of claim 7, wherein the individual unique identifier of each video communication device includes a member number, and the group-wide unique identifier includes a member description.

9. The video communication system of claim 8, wherein the server hardware device is configured to coordinate communication sessions between a plurality of video communication devices of the same user group using the member description to select a video communication device within the common user group to receive an incoming call.

10. The video communication system of claim 7, wherein the server hardware device is configured to coordinate communication sessions between a plurality of video communication devices of the same group using the group unique identifier to select all video communication devices within the common group to receive an incoming call with the exception of the video communication device initiating the incoming call.

11. A method for establishing communication with a plurality of video communication devices that are specifically configured for use by a hearing-impaired user, the method comprising:
receiving an initial call request from first communication device associated with a hearing-capable user using a unique identifier selected from the group consisting of a network-wide individual unique identifier, a group unique identifier, and a group-wide individual unique identifier, wherein:

the network-wide individual unique identifier is unique to video communication devices over a network;
the group unique identifier is shared by a common user group of video communication devices associated with a single hearing-impaired user; and
the group-wide individual unique identifier being unique to an individual video communication device within the common user group of video communication devices that is smaller than a number of video communication devices configured for communication on the network;
translating the group-wide individual unique identifier to a corresponding network-wide individual unique identifier either within a video communication device using group information maintained by a profile server of a video relay service to be sent to a call routing server of the video relay service or within the call routing server using the group information when the group-wide individual unique identifier is used by the video communication device to place the call, wherein the group information is shared by other devices of the same user group; and
routing the call associated with the initial call request to at least a second video communication device through call routing server of the video relay service providing translation services for a communication session.

12. The method of claim 11, further comprising:
receiving another call request from another video communication device that is a member of the common user group of video communication device including the second communication device; and
routing another call associated with the another call request to at least the second video communication device.

13. The method of claim 11, wherein the group-wide individual unique identifier includes a member description.

14. The method of claim 13, wherein the member description is selected by a user from the group consisting of a word and a phrase.

15. The method of claim 13, wherein receiving the initial call request includes both the group-wide individual unique identifier and the group unique identifier when the initial call request originates from a communication device that is not part of the user group associated with the group unique identifier.

16. The method of claim 12, wherein receiving another call request from another video communication device that is a member of the common user group of video communication devices includes receiving a network-wide individual unique identifier for another video communication device of the common group including the another video communication device.

17. The method of claim 12, wherein receiving another call request from another video communication device that is a member of the common user group of video communication devices includes receiving the group unique identifier for the common group including the another video communication device.

18. The method of claim 12, wherein receiving another call request from another video communication device that is a member of the common user group of video communication devices includes receiving the group-wide individual unique identifier for another video communication device of the common group including the another video communication device.

19. The method of claim 12, further comprising sending the network-wide individual unique identifier of the another video communication device to the second communication device as a caller identification for display by the second communication device.

20. The method of claim 12, further comprising sending the group-wide individual unique identifier of the another video communication device to the second communication device as a caller identification for display by the second communication device.

21. The method of claim 11, further comprising:
receiving another call request from another video communication device that is not a member of the common user group of video communication device including the second communication device;
routing another call associated with the another call request to at least the second video communication device;
sending the group unique identifier of the another video communication device to the second communication device as a caller identification for display by the second communication device if the another video communication device is part of another user group; and
sending the network-wide individual unique identifier of the another video communication device to the second communication device as a caller identification for display by the second communication device if the another video communication device is not part of another user group.

22. The method of claim 11, wherein translating the group-wide individual unique identifier to the corresponding network-wide individual unique identifier includes retrieving the network-wide individual unique identifier from a cache stored within the group information for the video communication device that is updated periodically by the profile server of the video relay service.

* * * * *